United States Patent [19]
Ota

[11] Patent Number: 5,684,899
[45] Date of Patent: Nov. 4, 1997

[54] OPTICAL COMMUNICATION NETWORK

[75] Inventor: Takeshi Ota, Kanagawa, Japan

[73] Assignee: Fuji Xerox Co., Ltd., Tokyo, Japan

[21] Appl. No.: 766,931

[22] Filed: Dec. 16, 1996

Related U.S. Application Data

[60] Continuation of Ser. No. 459,327, Jun. 2, 1995, abandoned, which is a division of Ser. No. 26,054, Mar. 4, 1993, abandoned.

[30]   Foreign Application Priority Data

| Mar. 5, 1992 | [JP] | Japan | 4-48521 |
| Sep. 1, 1992 | [JP] | Japan | 4-233892 |
| Dec. 8, 1992 | [JP] | Japan | 4-328266 |
| Dec. 15, 1992 | [JP] | Japan | 4-334747 |

[51] Int. Cl.$^6$ .................................................. G02B 6/28
[52] U.S. Cl. ............................ 385/24; 385/14; 385/46; 385/37
[58] Field of Search .................... 385/24, 46, 37, 385/14, 49, 89; 359/127–131

[56]   References Cited

U.S. PATENT DOCUMENTS

| 4,584,678 | 4/1986 | Ozeki et al. | 370/85.3 |
| 4,727,592 | 2/1988 | Okada et al. | 359/177 |
| 4,751,701 | 6/1988 | Roos et al. | 359/136 |
| 4,779,088 | 10/1988 | Restrepo | 370/85.2 |
| 4,784,935 | 11/1988 | Ehrfeid et al. | 385/37 |
| 4,821,255 | 4/1989 | Kobrinski | 385/24 |
| 4,845,703 | 7/1989 | Suzuki | 370/3 |
| 4,894,819 | 1/1990 | Kondo et al. | 359/136 |
| 4,939,725 | 7/1990 | Matsuda et al. | 370/85.3 |
| 4,957,339 | 9/1990 | Fussaganger et al. | 385/24 |
| 5,206,753 | 4/1993 | Grimes | 359/128 |
| 5,206,920 | 4/1993 | Cremer et al. | 385/37 |
| 5,228,103 | 7/1993 | Chen et al. | 385/14 |
| 5,241,490 | 8/1993 | Hill et al. | 359/128 |
| 5,367,395 | 11/1994 | Yajima et al. | 359/110 |
| 5,371,813 | 12/1994 | Artigue | 385/24 |

FOREIGN PATENT DOCUMENTS

| 0 393 372 A3 | 3/1990 | European Pat. Off. . |
| 0 408 261 A1 | 7/1990 | European Pat. Off. . |
| 0 449 202 A1 | 3/1991 | European Pat. Off. . |
| 0 476 384 A1 | 8/1991 | European Pat. Off. . |
| 0 497 358 A1 | 1/1992 | European Pat. Off. . |
| 3246241 | 6/1984 | Germany . |
| 63-244003 | 10/1988 | Japan . |
| 3-94705 | 4/1991 | Japan . |
| 3-251677 | 11/1991 | Japan . |
| 3-270432 | 12/1991 | Japan . |
| 3-296332 | 12/1991 | Japan . |
| 2227854A | 8/1990 | United Kingdom . |
| WO 99/09605 | 8/1990 | WIPO . |
| WO-A-9210041 | 6/1992 | WIPO . |

OTHER PUBLICATIONS

Stevenage, Electronic Letters, May 26, 1988, pp. 672–674, vol. 24, No. 11.

Rawson et al., "Fibernet: Multimode Optical Fibers For Local Computer Networks," IEEE Transaction on Communications, vol. COM–26, No. 7, Jul. 1978, pp. 983–990.

Shoch et al., "Measured Performance Of An Ethernet Local Network," Communications of A.C., vol. 23, No. 12, 1990, pp. 711–729.

(List continued on next page.)

Primary Examiner—John Ngo
Attorney, Agent, or Firm—Finnegan, Henderson, Farabow, Garrett & Dunner, L.L.P.

[57]   ABSTRACT

In an optical communication network in which a plural number of nodes are connected to each bidirectional broadcasting bus, and a node communicates with another using the packets, or an optical communication network in which a plural number of nodes are connected to a bidirectional broadcasting bus, and a node communicates with another using the packets, each node comprises carrier sensing means for sensing a carrier on the broadcasting bus, and jamming detecting means for detecting a jamming state of received signals.

19 Claims, 35 Drawing Sheets

OTHER PUBLICATIONS

Okuda et al., "Planar Gradient–Index Glass Waveguide And Its Applications To A 4–Port Branches Circuit And Star Coupler," Applied Optics, vol. 23, No. 11, Jun. 1984, pp. 1745–1746.

Kurokawa, et al., "Fiber Optic Sheet Formation By Selective Photopolymerization," Applied Optics, vol. 17, No. 4, Feb. 1978, pp. 646–650.

Burns et al., "Mode Conversion In Planar–Dielectric Separating Waveguides," IEEE Journal Of Quantum Electronics, vol. QE–11, No. 1, Jan. 1975, pp. 32–39.

Ota, "Coupled Star Network: A New Configuration For Optical Local Area Network," Commun., vol. E75–B, No. 2, Feb. 1992, pp. 67–75.

Tamura et al., "Optical Cascade Star Network–A New Configuration For A Passive Distribution System With Optical Collision Detection Capability".

Reedy et al., "Methods Of Collision Detection In Fiber Optic CSMA/CD Networks," *IEEE Journal of Selected Areas in Communications*, vol. SAC–2, No. 6, Nov. 1985, pp. 890–896.

Hakamata et al., "Design And Performance Of A Repeater For CSMA/CD Passive Optical Star Network Connection," Electronics And Communications in Japan, vol. 73–B1, No. 4, Aprl. 1990, pp. 66–76.

Published Unexamined Japanese Patent Application No. Hei. 5–3457 (corresponding to U.S. Patent Application No. 07/813,443) dated Jan. 8, 1993, the relevance of which is discussed at p. 6 of the specification.

Published Unexamined Japanese Patent Application No. Hei. 5–14385 (corresponding to U.S. Patent Application No. 07/873,448) dated Jan. 22, 1993, the relevance of which is discussed at p. 7 of the specification.

Published Unexamined Japanese Patent Application No. Hei. 4–326831 dated Nov. 16, 1992, the relevance of which is discussed at p. 8 of the specification.

Published Unexamined Japanese Patent Application No. Hei. 5–14285 (corresponding to U.S. Patent Application No. 07/946,192) dated Jan. 22, 1993, the relevance of which is discussed at p. 28 of the specification.

"Study On Arranging Collision Detecting circuits For optical Star Networks," The Institution of Electronics and Communication Engineers, Optics/Radio Section, National Convention Record 341 (1992) (in Japanese), the relevance of which is discussed at p. 4 of the specification.

Ikebata et al., "Multi–Channel CSMA/CD With Hybrid Load Distribution/Region Distribution Scheme," Trans. of IECE (in Japanese) (B), vol. J70–B, No. 12, pp. 1466–1474 (1987), the relevance of which is discussed at p. 7 of the specification.

Takahashi et al., "Analysis Of Transmission Loss In Matrix Optical Waveguide," 1992 IEICE Spring Conference Record, C–192 (1992), the relevance of which is discussed at p. 53 of the specification.

Azuma et al., "A Study On The Loss Change Mechanism At On Optical Fiber Bending Region," 1992 IEICE Spring Conference Record, B–893 (1992), the relevance of which is discussed at p. 55 of the specification.

Shibata et al., "Branching Characteristics of Multi–Stage Connected Asymmetric Y–Branch Using Total Reflection," 1992 IEICE Spring Conference, C–198 (1992), the relevance of which is discussed at p. 62 of the specification.

FIG. 2(a) REF. CLOCK 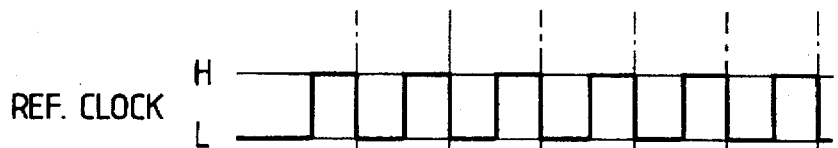
FIG. 2(b) OUTPUT SIGNAL 
FIG. 2(c) COLLISION SIGNAL 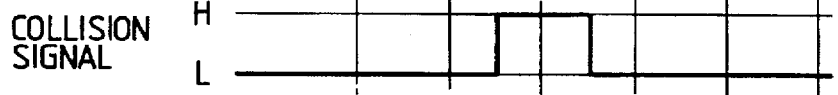
FIG. 2(d) RECEIVED SIGNAL 
FIG. 2(e) REPRODUCED SIGNAL 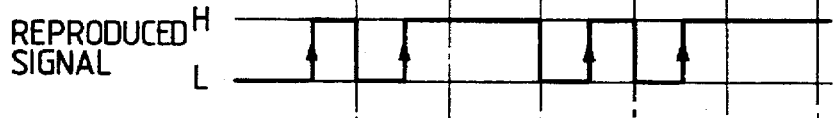
FIG. 2(f) CRV SIGNAL 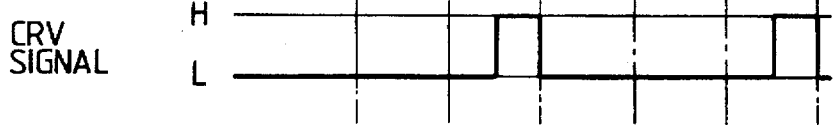
TIME →

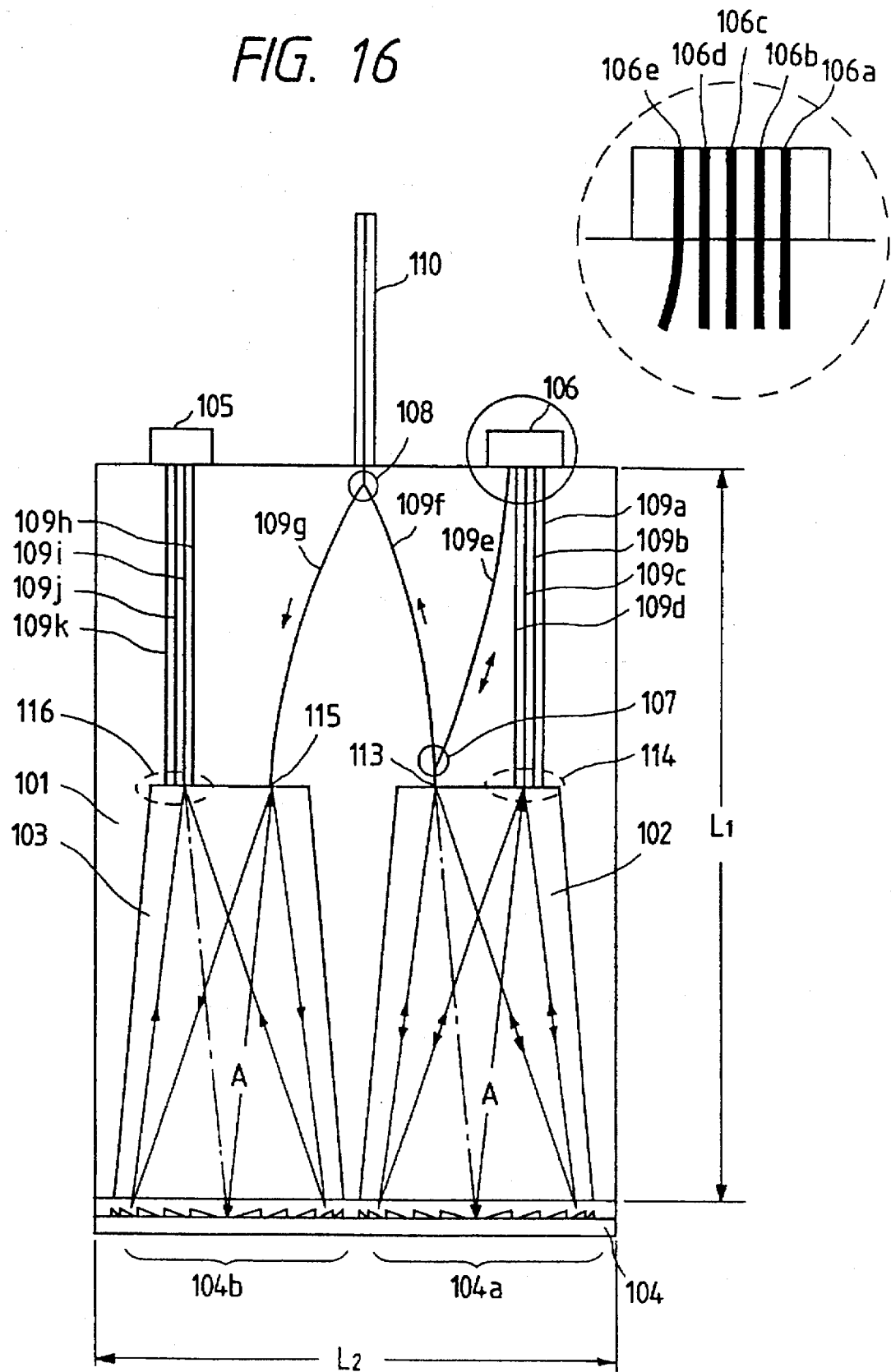

FIG. 17(a)
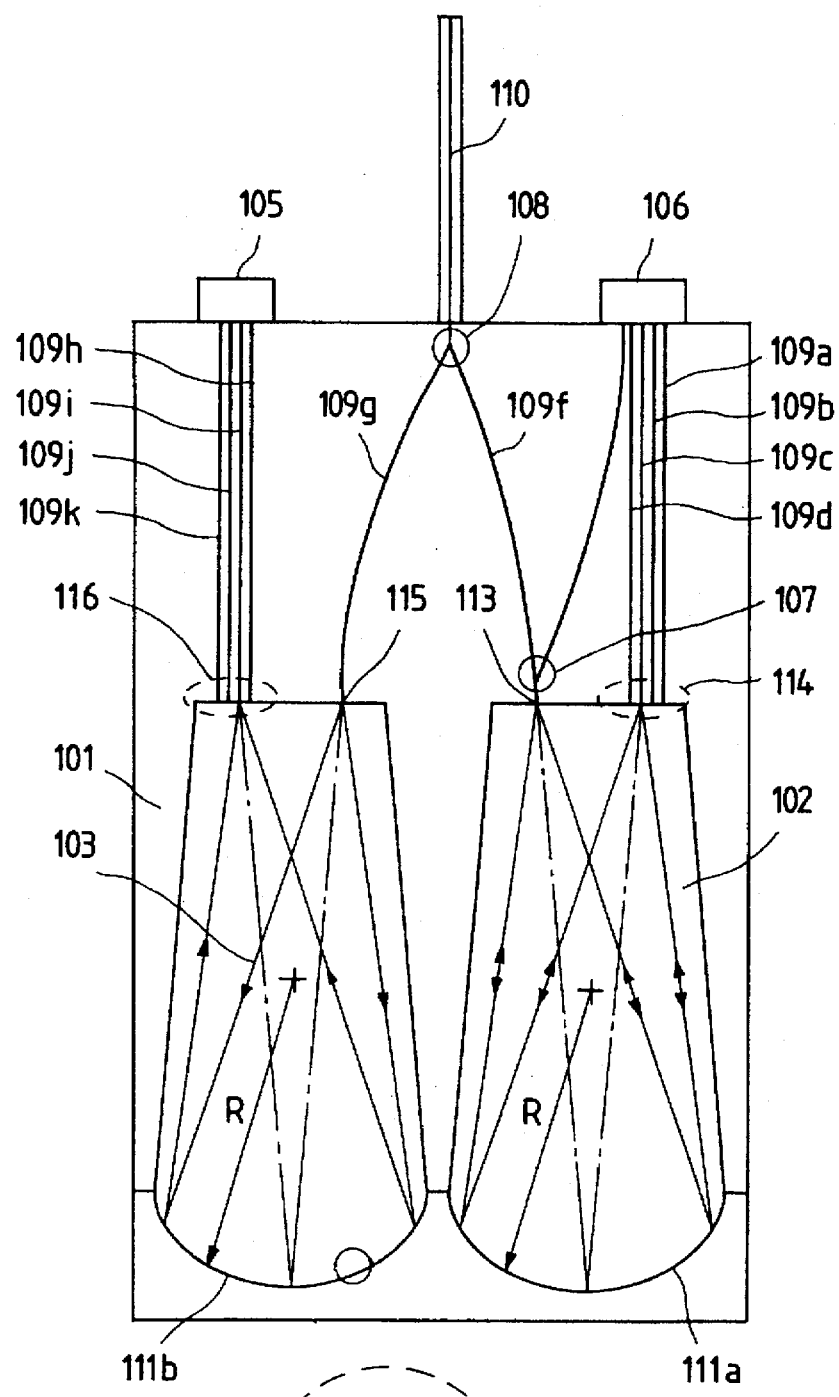
FIG. 17(b)
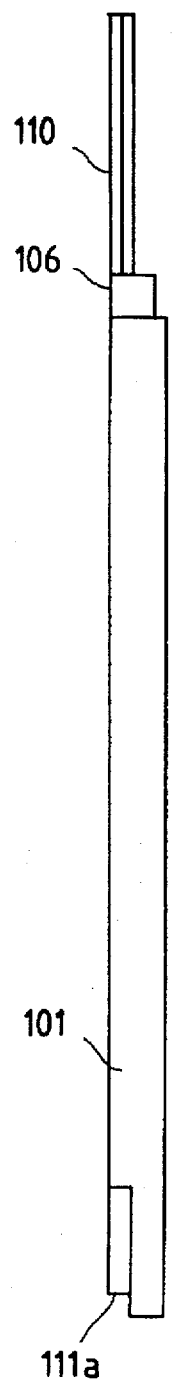
FIG. 17(c)

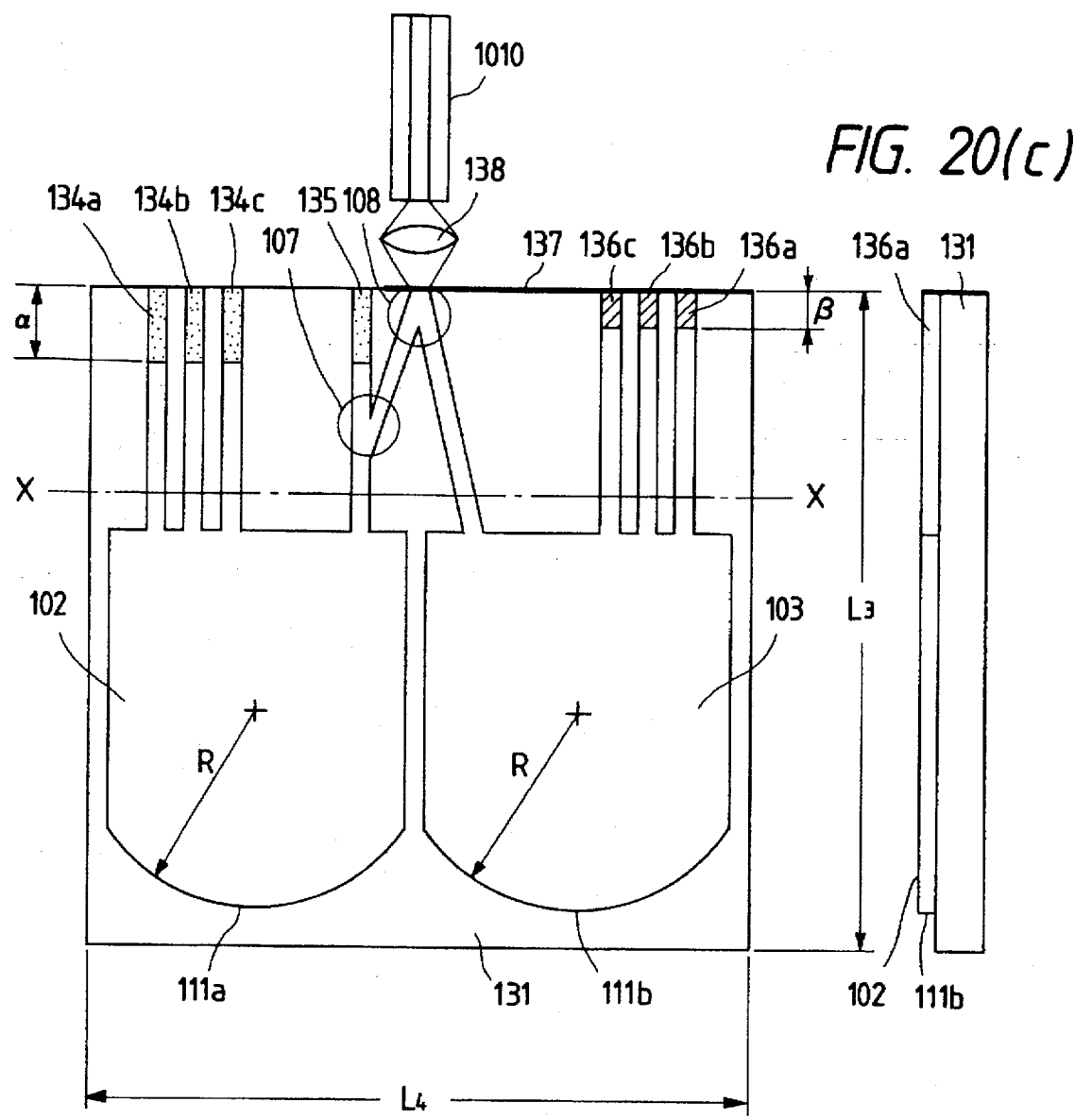
FIG. 20(a)
FIG. 20(c)
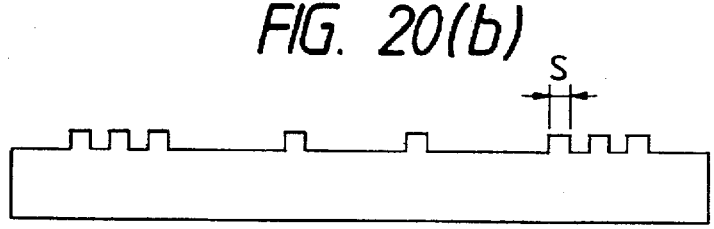
FIG. 20(b)

FIG. 25
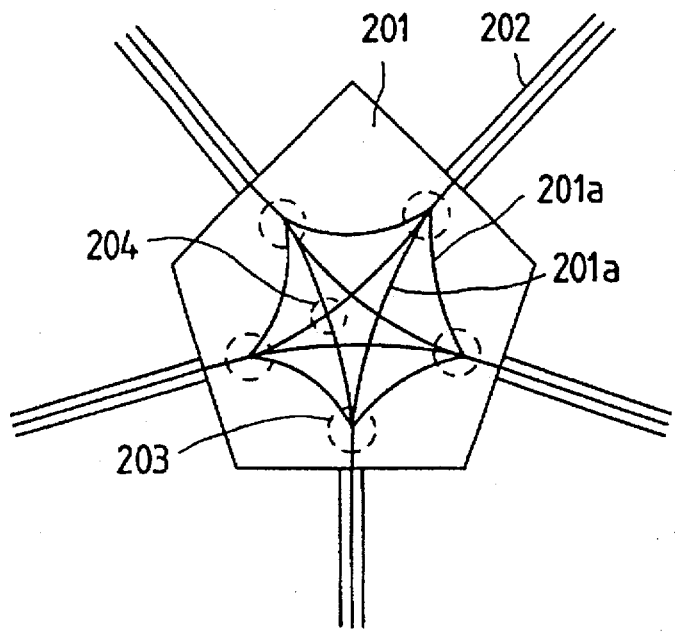
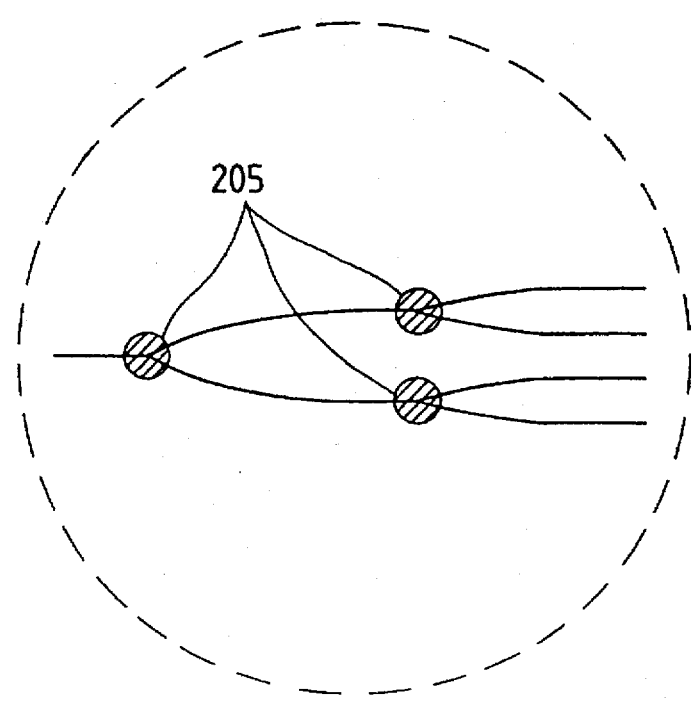
FIG. 25a

FIG. 27
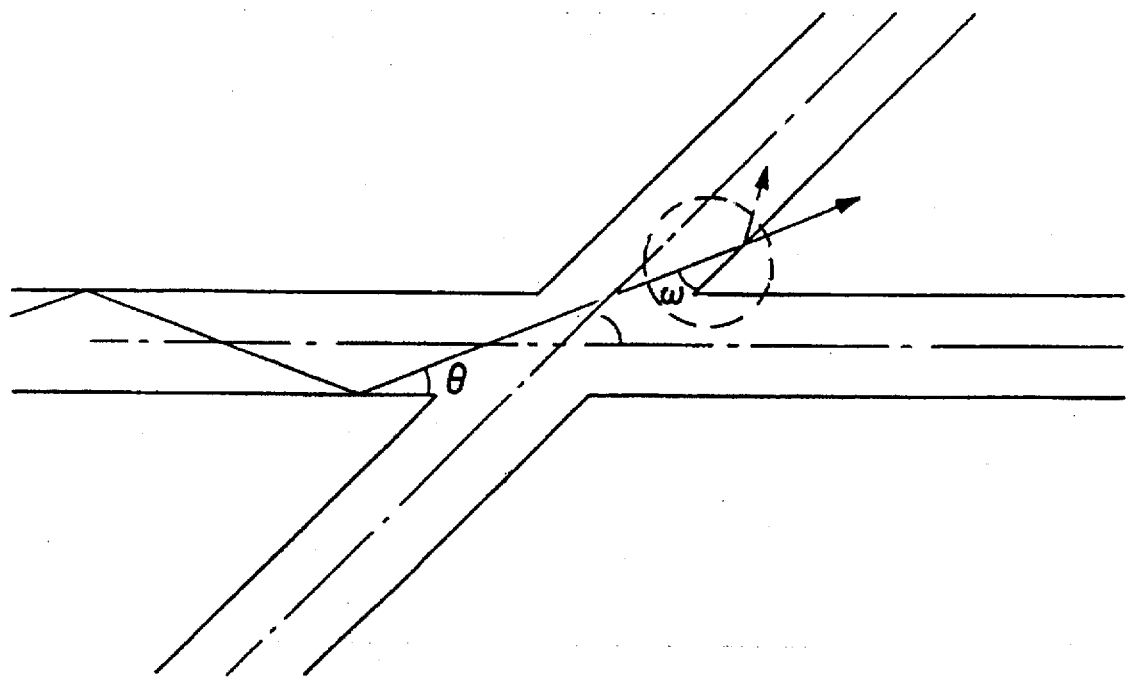
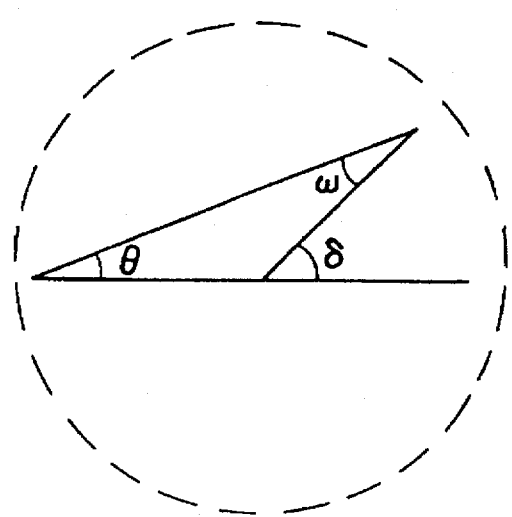
FIG. 27a

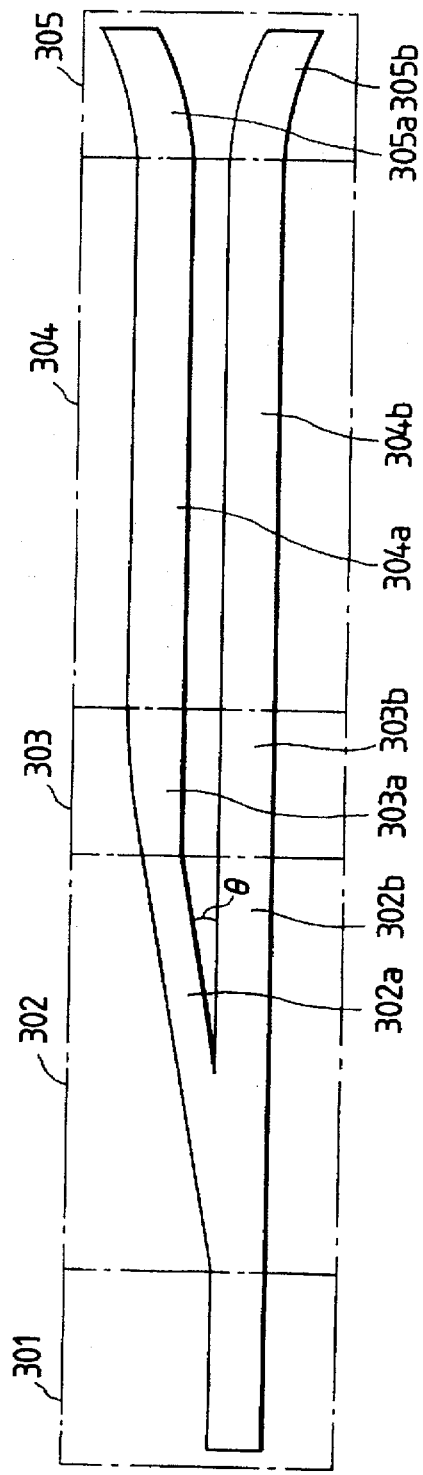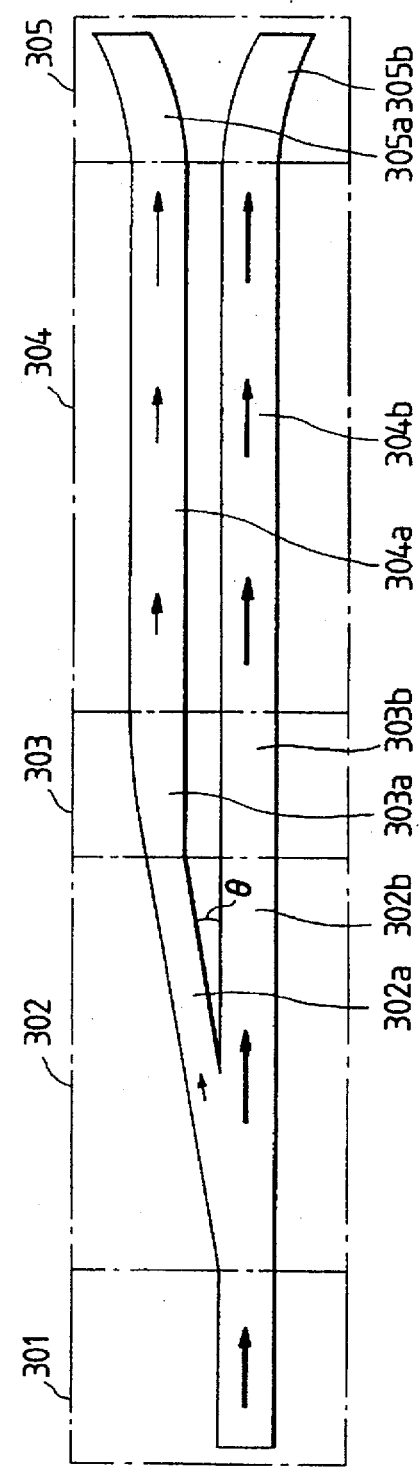

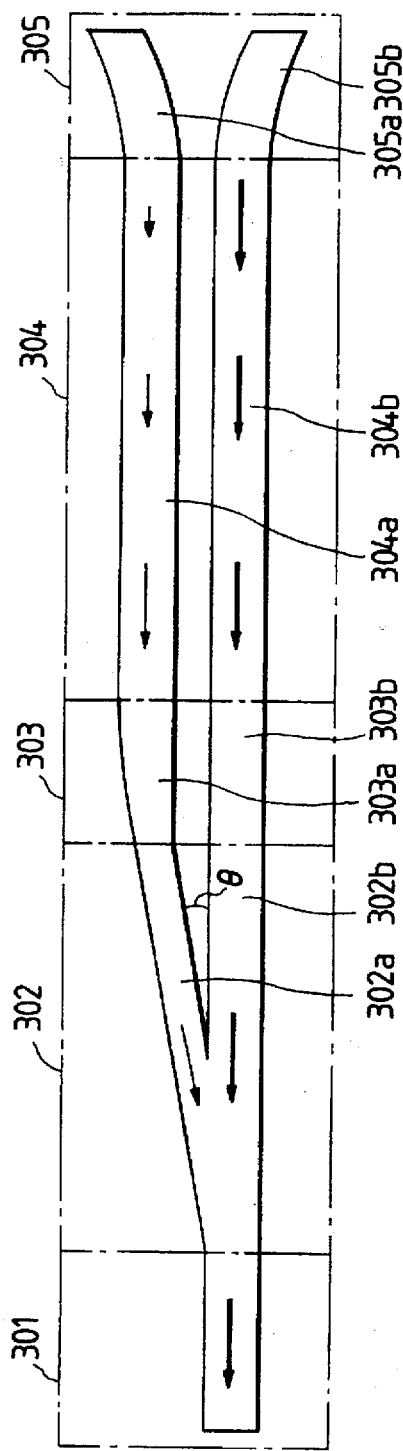
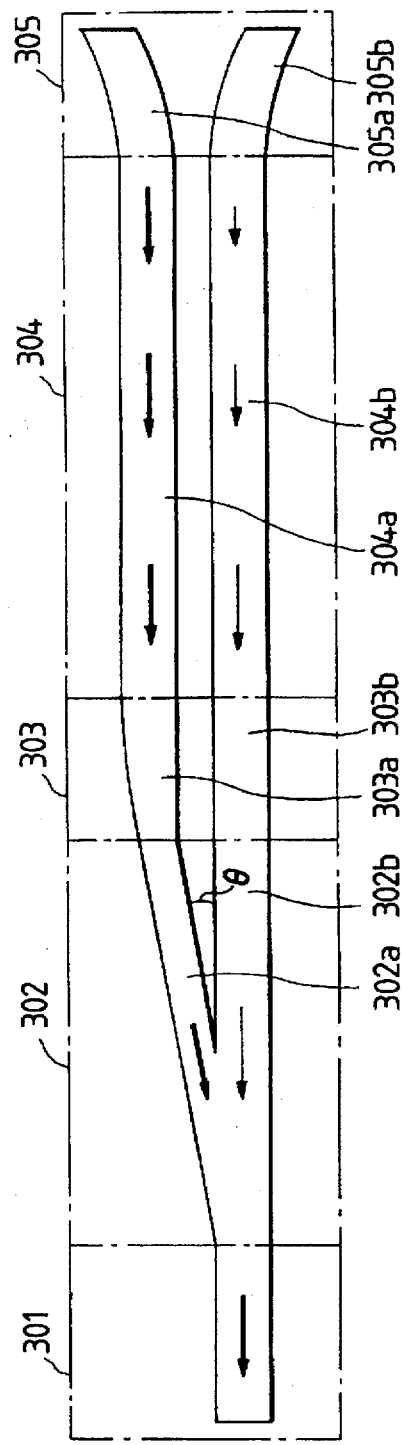
FIG. 33
FIG. 34

FIG. 38
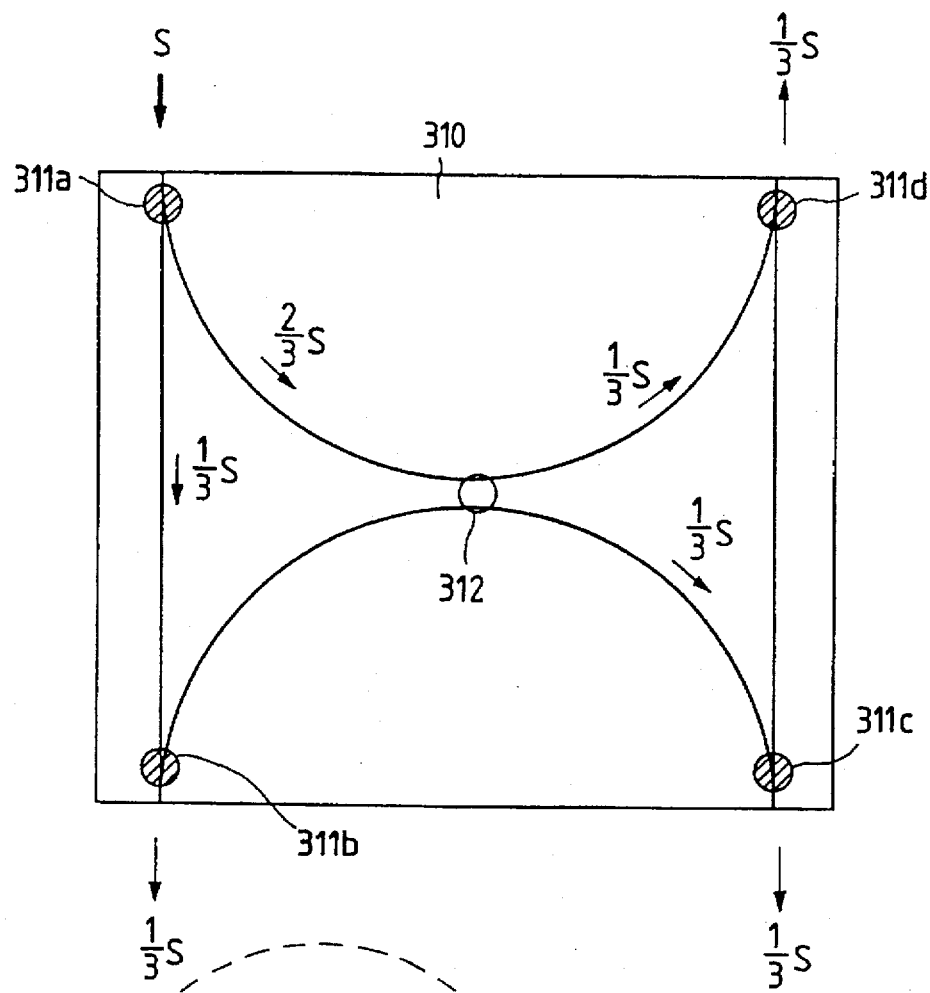
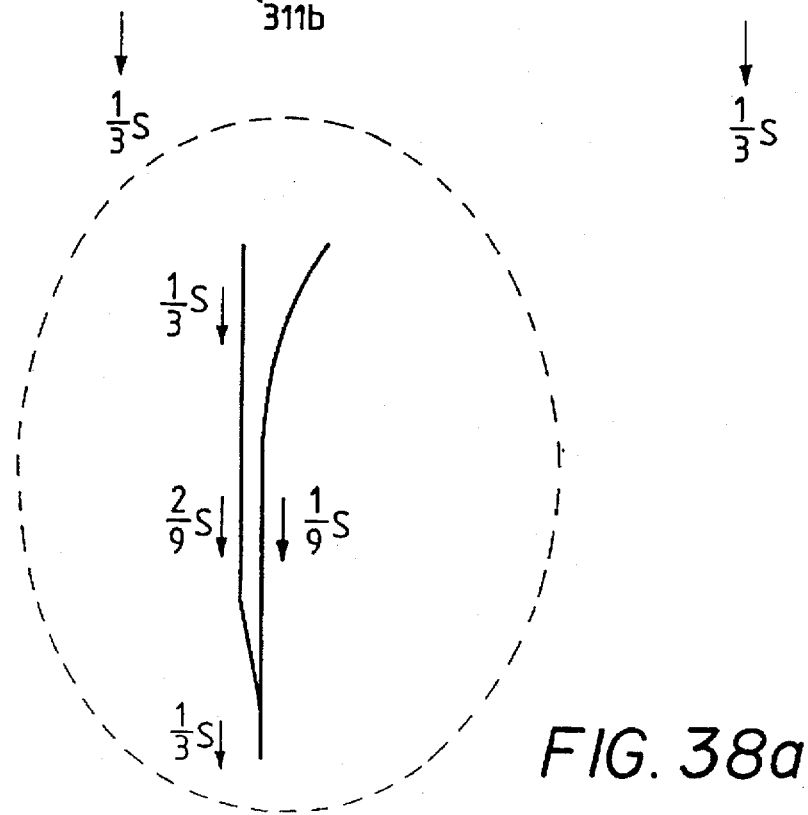
FIG. 38a

FIG. 39
FIG. 39a
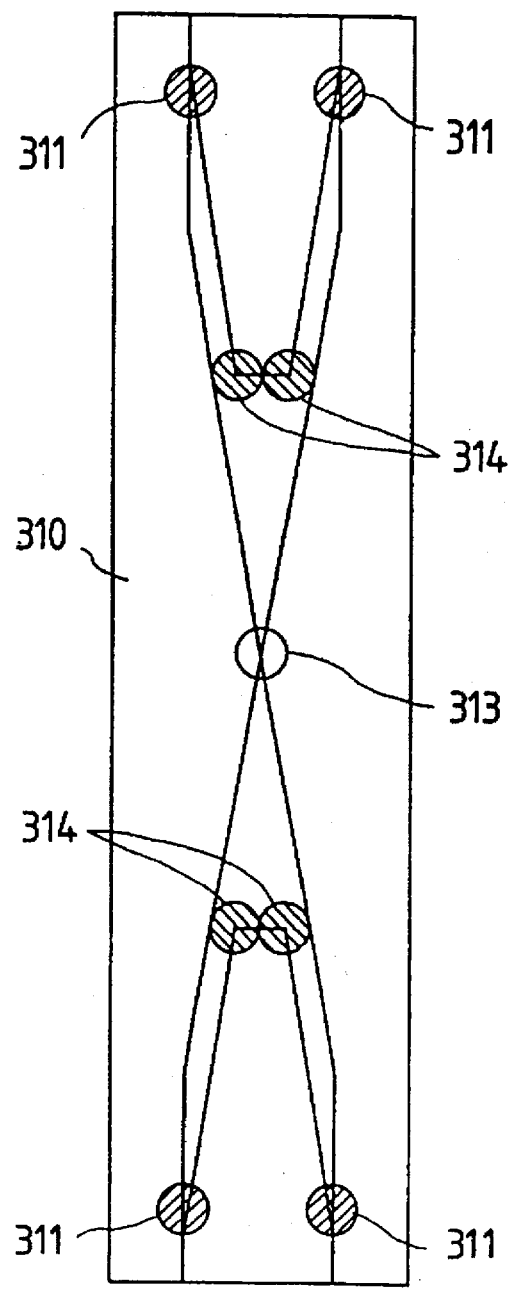
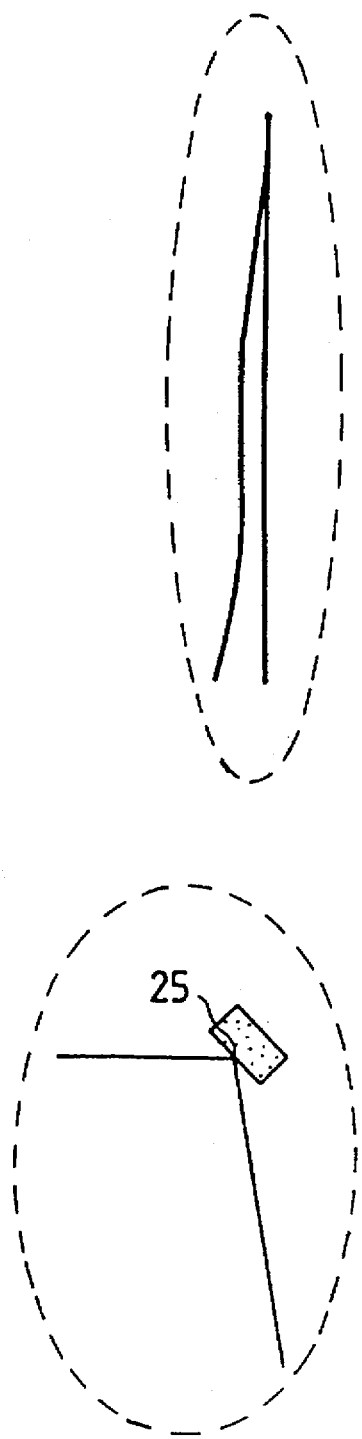
FIG. 39b

OPTICAL COMMUNICATION NETWORK

This application is a continuation, of application Ser. No. 08/459,327, filed Jun. 2, 1995, now abandoned, which was a divisional of application Ser. No. 08/026,054, filed Mar. 4, 1993, now abandoned.

BACKGROUND OF THE INVENTION

1. Field of the Invention

The present invention relates to an optical LAN (local area network) and a protocol used in the optical LAN. More particularly, the invention relates to an optical LAN in which a collision on the network is detected, and the result of collision detection is used for communication control.

2. Description of the Related Art

In a general LAN, a plural number of nodes are connected to a bus. The nodes communicates with one another through the bus. One of the buses used in the LAB is a broadcasting bus. When using the broadcasting bus, a signal sent by a node can be simultaneously received by all of the nodes. ETHERNET (Trade Mark) is well known as one of the LAN using the broadcasting bus. The protocol used in ETHERNET is called a CSMA/CD (carrier sense multiple access/collision detection) system, prescribed in IEEE 803.3. In ETHERNET, coaxial cables are used for transmission medium. The nodes are connected by the coaxial cables. A node which will send a signal checks whether or not a signal from another node is present on the coaxial cable. If it is not present, the sending node starts the signal transmission. Actually, there is the possibility that two nodes simultaneously send signals. This state is called a collision. In ETHERNET, the collision is detected in the form of a voltage level in the coaxial cable.

After detecting the collision, the node sends a jamming signal for a preset time, and then is set to an random-time stand-by mode. The Jamming signal must be set to be longer than the maximum Maximum round trip time of the network, in order to broadcast the collision to all of the nodes connected to the network. The random-time stand-by mode is provided in order to avoid such a situation that a plural number of nodes fail to send, and if those nodes simultaneously start to send signals immediately after a communication channel becomes idle, the collision occurs again.

The optical communication system has gradually been used also in the LAN. In the LAN using the optical fiber as the transmission media, the number of nodes cannot be increased by simply increasing the number of taps, although it can be increased so in the LAN using the coaxial cable as transmission media.

To solve the problem, there is a proposal of a new optical communication network in which each node is provided with two separate ports, one for transmission and the other for reception, and the nodes are coupled through a star coupler. For the proposal, reference is made to E. G. RAWSON ET AL., "Fibernet: Multimode Optical Fibers for Local Computer Networks", IEEE Transaction on Communications, Vol., COM-26, No. 7, p 395 (1978).

The optical communication network using the star coupler is schematically illustrated in FIG. 1. In the figure, reference numerals 26a and 26b designate optical fibers 27, nodes 25, a star coupler of the mixing rod type; and 24, terminals. A signal output from each node 27 is converted into a light signal by a light emitting element 22 of the node. The light signal is supplied through the optical fiber 26a associated therewith to the star coupler 25. The light signals transmitted from the nodes are all mixed by the star coupler 25, and then are distributed to the light sensing elements 23 of the nodes, through the related optical fibers 26b. The light signal is converted into an electrical signal by the related light sensing element, and supplied to the node 27. In the communication network thus arranged, a signal transmitted from one node is transmitted to all of the nodes, viz., the network has a broadcasting function. Accordingly, the communication network, which is similar to ETHERNET, can be constructed.

In the proposal, as the number of nodes coupled with the star coupler is increased, the level of a receiving signal is decreased in each node. One of the possible ways to solve the level down problem is to extend the network by additionally using star couplers and relay amplifiers. This approach suffers from another problems, however. The star coupler, when receiving a signal from a node, sends it also to the receiving port of the same node. Accordingly, a feedback loop is formed between the star couplers interconnected. If a relay amplifier is located between the star couplers, an oscillation occurs. When the star coupler is used, the number of nodes that can be connected to the network is limited to the number of terminals of one star coupler.

As described above, the signal transmitted from a node is distributed to the receiving port of the same node. This makes it difficult to detect the collision. That is, since the distribution ratios of actual passive star couplers are not uniform, it is difficult to apply the level-difference detecting method for the collision detection.

To cope with the problem, a CRV (code rule violation) method was proposed for a collision detecting system, which is to be applied for the network using the passive star coupler as shown in FIG. 2. The CRV was discussed by Oguchi et al., in their paper "Study on Arranging Collision Detecting Circuits for Optical Star Networks", The Institution of Electronics and Communication Engineers, Optics/Radio Section, National Convention Record 341, 1982.

The CRV method is constructed on the basis of the fact that in the Manchester coding system used in ETHERNET, one-bit information is expressed by two bits, that is, utilizes such redundancy of the Manchester coding system.

In the Manchester coding system, the leading edge at the central part of one period of the reference clock signal shown in FIG. 2(a), is assigned to logical "1" of data, and the trailing edge, to "0" of data. FIG. 2(b) shows an example of the Manchester code, which represents data "110111". As seen from the figure, in the normal state of the Manchester code, the duration of a H (high) level state or a L (low) level state is within one period of a reference clock signal (FIG. 2(a)).

Let us consider a case where a collision signal as shown in FIG. 2(c) collides with a transmission signal as shown in FIG. 2(b). As the result of the collision, an intensity distribution of the receiving signal takes a profile as shown in FIG. 2(d). The receiving signal, when demodulated, has a bit pattern as shown in FIG. 2(e). The H level state of which the duration exceeds one period of the reference clock signal is found in the demodulated signal. Thus, when a code (code rule violation code), which should not exist, is detected, a CRV signal as shown in FIG. 2(c) is generated. The collision signal shown in FIG. 2(c) represent phase-shifted Manchester codes. Since the nodes are not synchronized, phases where the Manchester codes are added are indefinite.

The CRV method is based on the rule that when a code (CRV code), which should not exist, is detected, it is deemed that a collision occurred. As seen from the rule, the collision is detected on the probability basis, but use of hardware properly selected will suffice for practical use.

To solve such a problem that the number of nodes that can be connected to the network is limited, the applicant of the present Patent Application proposed a new technique in Published Unexamined Japanese Patent Application No. Hei. 3-296332. In the proposed technique, of a plural number of transmission coefficients, which are for describing the transfer characteristic of a star coupler, the transfer coefficient of the signal transfer between a pair of input and output terminals of a node is set to 0, so that no feedback loop is formed when plural star couplers are combined. In an optical communication network in which star couplers are interconnected as described in the specification of the above publication, a signal that is transmitted from a node will never return to the node per se. Also in the network, the collision detecting mechanism can readily be realized in a manner that a receiving port is constantly monitored in a transmission mode, and if a signal is detected at the receiving port, it is determined that a collision has occurred.

Further, in the proposed network, a node can receive a signal from another node even if it is sending a signal. Thus, the node can concurrently perform the transmitting and receiving operations. In other words, the optical communication network in the Patent Application serves as a bidirectional bus.

A technique that a single optical fiber is used for a bidirectional communication in the network including the combination of star couplers, is also disclosed in the co-pending U.S. patent application Ser. No. 07/813,443, filed by the Applicant of the present Patent Application. The co-pending U.S. patent application Ser. No. 07/873,448, filed by the Applicant of the present Patent Application, describes that a multichannel LAN can be constructed in which, by multiplexing wavelengths in the network, a plural number of broadcasting buses using a single optical fiber as a transmission media are arranged in parallel, and that a multimedia LAN which can handle both the data communication and real-time responsible signals, such as audio and video signals, can be constructed by using the plural broadcasting buses.

For the operation of the multichannel LAN, the CSMA/CD system is theoretically discussed (by Ikebata and Okada "Multi-Channel CSMA/CD with Hybrid Load Distribution/Region Distribution Scheme", Trans. of IECE (in Japanese) (B), Vol., J70-B, No. 12, pp 1466–1474 (1987)).

The bidirectional communication system rejects the use of the collision detecting method in which the node constantly monitors its receiving port, and when detecting a signal at the receiving port, it decides that the collision occurred. In the bidirectional bus, to make a bidirectional communication by using the protocol of the line competition type, one will probably encounter such a situation that just before the communication between first and second nodes will start, a third node starts to send a signal. The collision of the third party is similar to the collision with another transmission node in the unidirectional communication.

In the communication network, for example, ETHERNET, which uses broadcasting buses, a signal transmitted by a node can be received by all other nodes. This broadcasting feature is disadvantageous in securing the secrecy of communication.

To solve the problem, the Applicant of the present Patent Application proposed a novel technique to keep away from the collision with the third node in Patent Application No. Hei. 3-97405. In the technique, after sending the signal, a sending node still continues to monitor the broadcasting bus for a time period τ1, which is longer than a go/return propagation delay τ0 of the broadcasting bus. A responding node starts to return a response signal after a time τ2, which is longer than the time τ1, since the responding node receives a packet destined thereto.

In a case where the line-competition type protocol is used for communication on the communication network of the broadcasting bus, a situation where plural nodes simultaneously send signals through the broadcasting bus inevitably occurs; that is, the collision inevitably occurs. If the node starts the signal transmission after monitoring a state of the broadcasting bus, there is the probability that plural nodes, not yet knowing the signal transmission of other parties, start to send signals at time intervals each shorter than the Maximum round trip time of the broadcasting bus.

In the conventional line-competition type protocol, e.g., the CSMA/CD system, the colliding nodes send jamming signals for a preset time (substantially equal to the Maximum round trip time of the broadcasting bus). The nodes are placed to the random-time stand-by mode, and then start again the signal transmission. The transmission of the jamming signal ensures a reliable collision detection. Where the collision occurs, no effective communication is performed and only the jamming signals flow through the broadcasting bus. The send requests issued from the colliding nodes are left unremoved. The latent communication demands are accumulated in the form of the random-time stand-by.

In the present specification, a state that two nodes simultaneously send signals within the Maximum round trip time of the broadcasting bus is called a 2-node collision. States that three and four nodes simultaneously send signals are called 3-node collision and 4-node collision, respectively. The collision of three or more nodes is generally called a multiple-collision. Accordingly, the 2-node collision is not the multiple-collision. Most of the collisions occurring on the broadcasting bus is the 2-node collision. The multiple-collision rarely occurs on the broadcasting bus. This will be described.

It is assumed that sending requests (referred to as calls) are randomly generated from a plural number of nodes connected to the broadcasting bus, and that an average frequency of call occurrence per unit time is Λ. When 1000 calls are generated every second, the average frequency Λ is 1000 calls/sec. The phenomenon is expressed by the random process, called a Poisson distribution. The Poisson distribution is the function to provide a probability that n number of calls occur when the broadcasting bus is monitored for a preset time τ. n generally indicates a positive integer. The Poisson distribution is given by the following equation.

$$P\tau(n) = e^{-\Lambda\tau}/n!(n \geq 1) \qquad (1)$$

When n=0, the Poisson distribution is given by the following equation.

$$P\tau(0) = e^{-\Lambda\tau} \qquad (2)$$

When Λ=1000 calls/sec. (=10³ calls/sec.), the probability Pτ that one call is observed during τ=50 sec is $$P\tau(3) = 1.98 \times 10^{-5}.$$

The probability P τ that no call is observed during τ=50 μsec. is $$P\tau(0) = 0.951.$$

Where τ is the Maximum round trip time, if one call is observed during the time period τ=50 sec, then no collision occurs. If two calls are observed, 2-node collision occurs. If three calls are observed, 3-node collisions occurs. Pτ(0) indicates that when the broadcasting bus is monitored during τ =50 sec, no call occurs, viz., the line is left idle.

When the probability of 2-node collision occurrence is compared with that of 3-node collision occurrence, then we have ti $P\tau(3)/P\tau(2)=1.60\times10^{-2}=1.6\%$, if Λ=1000 calls/sec and τ=50 sec. The probability comparison indicates that in most cases, 2-node collision occurs, and in rare case, 3-node collision occurs. It is known that as the average call-occurrence frequency Λ per unit time, the percentage of the 3-node collisions becomes larger. In the case of large Λ, e.g., $\Lambda=10^4$ calls/sec, Pτ(3)/Pτ(2)=about 20%. In the graph of FIG. 3, the abscissa represents Λ (call/sec) and the ordinate, Pτ(3)/Pτ(2).

The experimental results show that the average call-occurrence frequency Λ in ETHERNET is at most 30 calls/sec. It is also known that the peak occurrence of calls is 50 to 60 times as large as the average value per day. For this, reference is made to J. F. Snoch and J. A. Hupp, "Measured performance of an Ethernet Local Computer Network", Communications of A.C., Vol. 23, No. 12, pp 711 to 729 (1980). Accordingly, it is seen that λ=1000 calls/sec is approximately the instantaneous maximum value of the call occurrence frequency.

As seen from the above description, if the 2-node collision can be suppressed, degradation of the channel utilization owing to the collision can be remarkably reduced. Further, it will be understood that when the 2-node collision occurs, if which of the colliding nodes has the priority to use the broadcasting bus can be decided, the result is equivalent to the case of effectively succeeding in avoidance of the 2-node collision. In other words, if one of the two colliding nodes permits the other to use the broadcasting bus, the send request of the former node is canceled. As a result, the accumulation of the potential send requests is reduced.

SUMMARY OF THE INVENTION

The present invention has been made in view of the above circumstances and has an object to provide an optical communication network which can efficiently use the broadcasting buses in the network in a manner that when the collision occurs in a broadcasting bus, the type of the collision is discriminated, and if it is the 2-node collision, the priority to use the broadcasting bus is determined for the nodes colliding with each other.

To achieve the above object, there is provided an optical communication network in which a plural number of nodes are connected to a bidirectional broadcasting bus, and a node communicates with another using the packets, wherein each node comprises: carrier detecting means for detecting a carrier on the broadcasting bus; and jamming detecting means for detecting a jamming state of received signals.

In the optical communication network, the carrier detecting means detects the 2-node collision, and the jamming detecting means detects the multiple-node collision.

A packet generated by each node includes a code train representative of the priority level of the packet. When the 2-node collision occurs, the code trains of the packets of the colliding nodes are compared with each other. Which of the colliding nodes first gains the right to use the broadcasting bus is determined on the basis of the comparison result.

In the optical communication network thus arranged, in a case where when a node will send a signal, a carrier is detected on the broadcasting bus, if the node starts to send a signal in disregard of presence of the carrier, the signal from the node will interfere with a signal sent from another node. The jamming state of the received signal indicates that the collision of two or more nodes has occurred on the broadcasting bus. Under this condition, if the signal transmission starts, the collision of three or more nodes will occur. Thus, when a collision occurs in the network, each node can discriminate the type of the collision, the 2-node collision or the multiple-node collision, by detecting both the carrier and the jamming state of the received signal.

The communication system of the invention, when a collision occurs, discriminates the type of collision, the 2-node collision and the multiple-node collision. When the collision is of the 2-node type, which of the priority levels of the colliding nodes to use the broadcasting bus is higher is determined by using the priority codes previously assigned to the packets. With this feature, the communication system can more efficiently use the communication channels than the conventional communication system of the type in which the nodes randomly competes for seizing the lines.

BRIEF DESCRIPTION OF THE DRAWINGS

The accompanying drawings, which are incorporated in and constitute a part of this specification, illustrated presently preferred embodiments of the invention and, together with the general description given above and the detailed description of the preferred embodiments given below, serve to explain the objects, advantages and principles of the present invention. In the accompanying drawings.

FIGS. 2(a) through 2(f) are a timing chart for explaining the principle of the code rule violation method;

FIGS. 16 and 16(a) are diagrams showing a first embodiment of a wavelength multiplexing transceiver for the wavelength multiplexing in an optical communication network;

FIGS. 17(a) and 17(b) are a plan view and a side view showing a second embodiment of a wavelength multiplexing transceiver for the wavelength multiplexing in an optical communication network; FIG. 17(c) is an enlarged view of gratings in FIG. 17(a)

FIGS. 20(a) through 20(c) are a diagram showing a fourth embodiment of a wavelength multiplexing transceiver according to the present invention;

FIGS. 25 and 25(a) are diagrams showing a first embodiment of an interconnectable 5-port star coupler according to the present invention;

FIGS. 27 and 27(a) are diagrams showing an incident angle ω of light from one waveguide to another;

FIG. 31 is a diagram showing a single mode optical waveguide;

FIGS. 32 to 37 are also diagrams each showing a single mode optical waveguide;

FIGS. 38 and 38(a) are plan view showing an embodiment of an interconnectable star coupler according to the present invention;

FIGS. 39-39(b) are plan view showing another embodiment of an interconnectable star coupler according to the present invention;

DETAILED DESCRIPTION OF THE PREFERRED EMBODIMENTS

Figure 1:
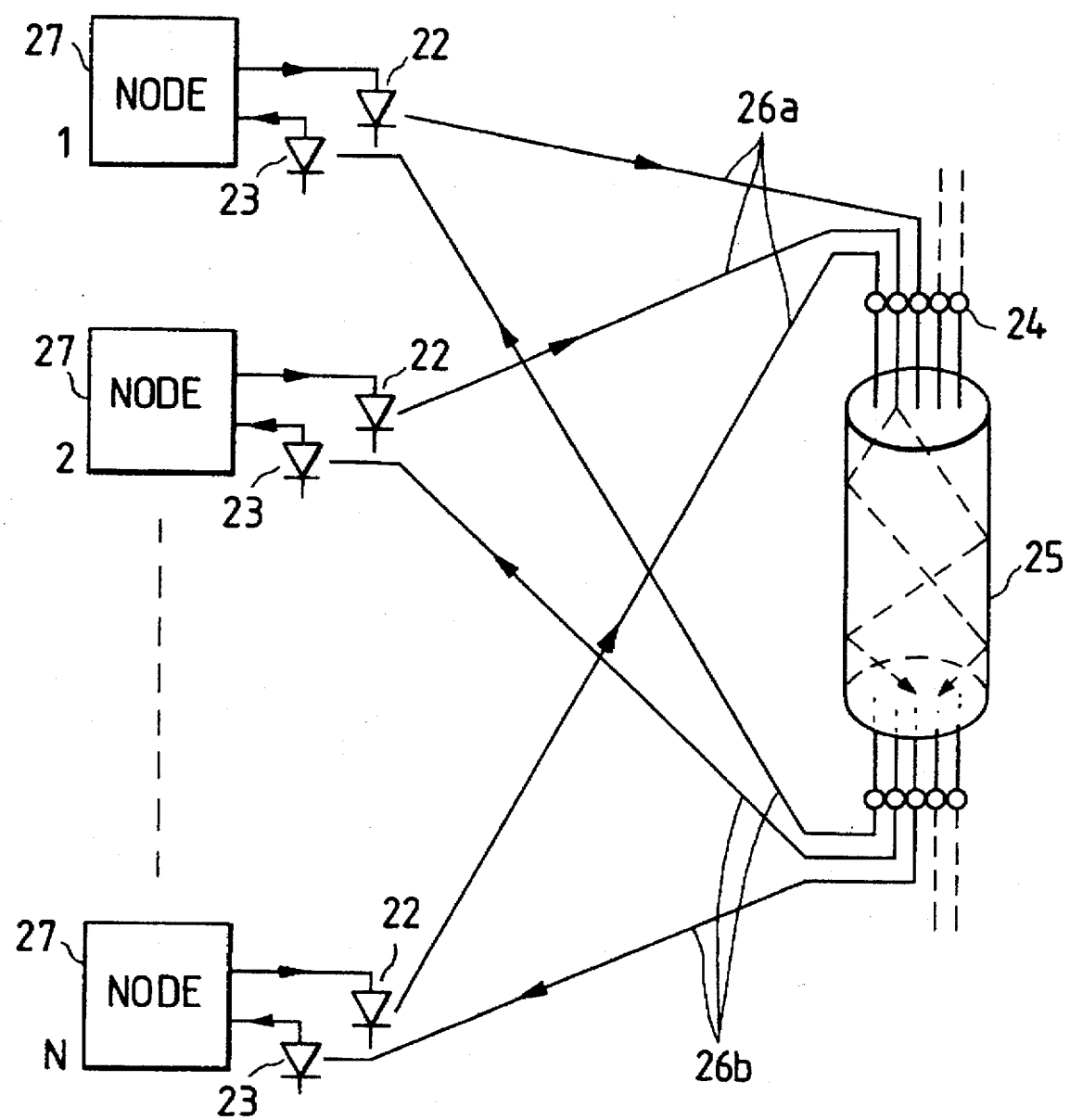
FIG. 1 is a diagram showing a conventional optical LAN using a star coupler.
Figure 3:
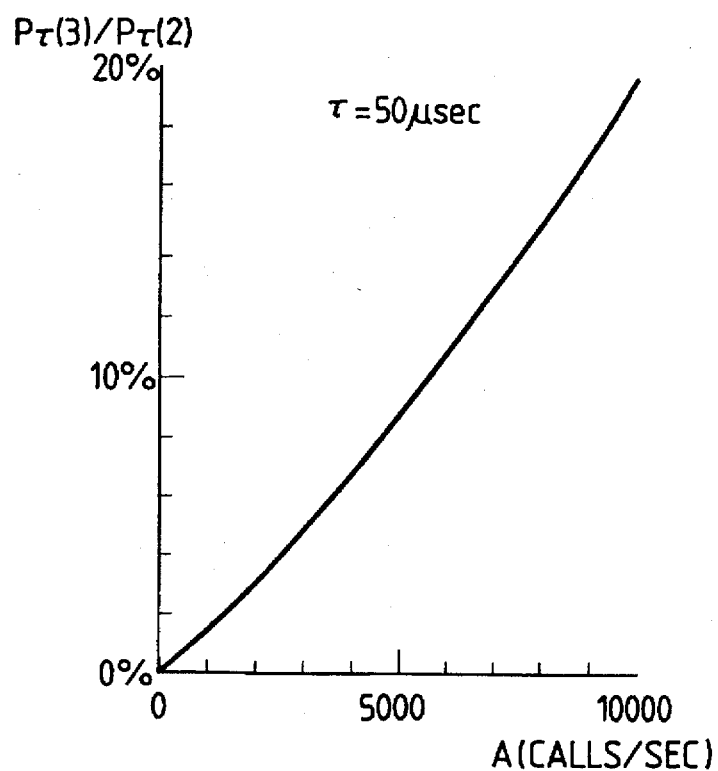
FIG. 3 is a graph showing a variation of the ratio of 3-node collision to 2-node collision with respect to the number of calls per unit time.

An optical communication network according to an embodiment of the present invention will be described with reference to FIG. 4.

As shown, a plural number of nodes 1 are interconnected through star couplers 2. In the communication network of FIG. 4, four star couplers 2 each with eight (8) terminals. Those couplers may be connected to one another. The star couplers 2 are interconnected through bidirectional optical amplifiers 3, thereby forming the network. Each node 1 is connected through a related optical fiber 4 to the related star coupler 2. The packet is used for the communication between the nodes 1. The optical amplifier 3 may be a semiconductor laser amplifier.

Figure 7:
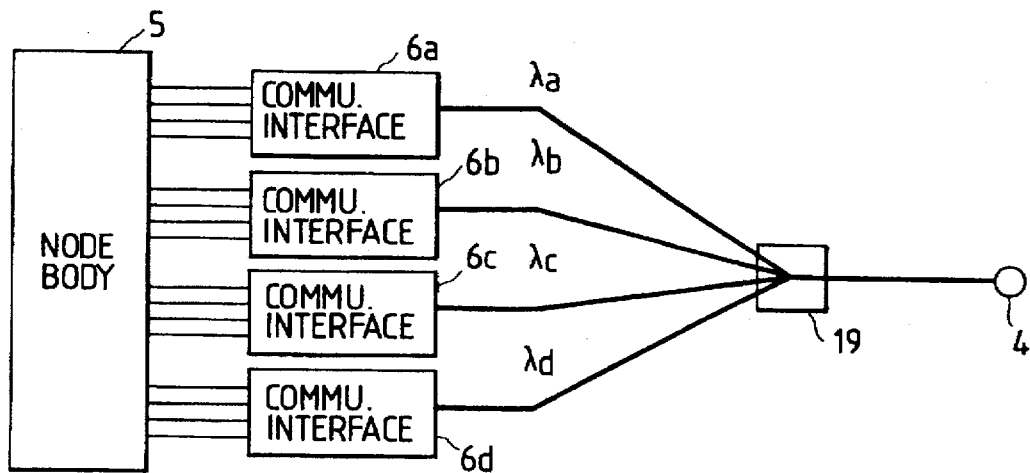
FIG. 7 is a block diagram showing the construction of another node used in an optical communication network according to a second embodiment of the present invention.

Two types of nodes 1, which may be used for the communication network shown in FIG. 4, will be described in detail. The first type of node and the second type of node are illustrated in FIGS. 5 and 7.

The first type of node shown in FIG. 5 will first be described. As shown in FIG. 5, the node 1 comprises a node body 5 and a communication interface 6. The communication interface 6 includes a light sensing element 9, such as a photo diode, and a light emitting element 8, such as a laser diode, and a optical coupler 7 for multiplexing and demultiplexing light signals of different wavelengths. The optical fiber 4 derived from the multiplexing/demultiplexing device 7 is connected to one of the terminals 14 of the star coupler 2 shown in FIG. 1. A transmission port 10 is a hardware for signal transmission, and a reception port 11 is a hardware for signal reception. The reception port 11 is coupled with a carrier sensor 12 and a code rule violation sensor 13. When sensing a carrier and a code rule violation, the sensors transfer signals representative of the carrier and the code rule violation to the node body 5, respectively. Thus, the node body 5 and the communication interface 6 are interconnected through four ways for signal flow.

Figure 4:
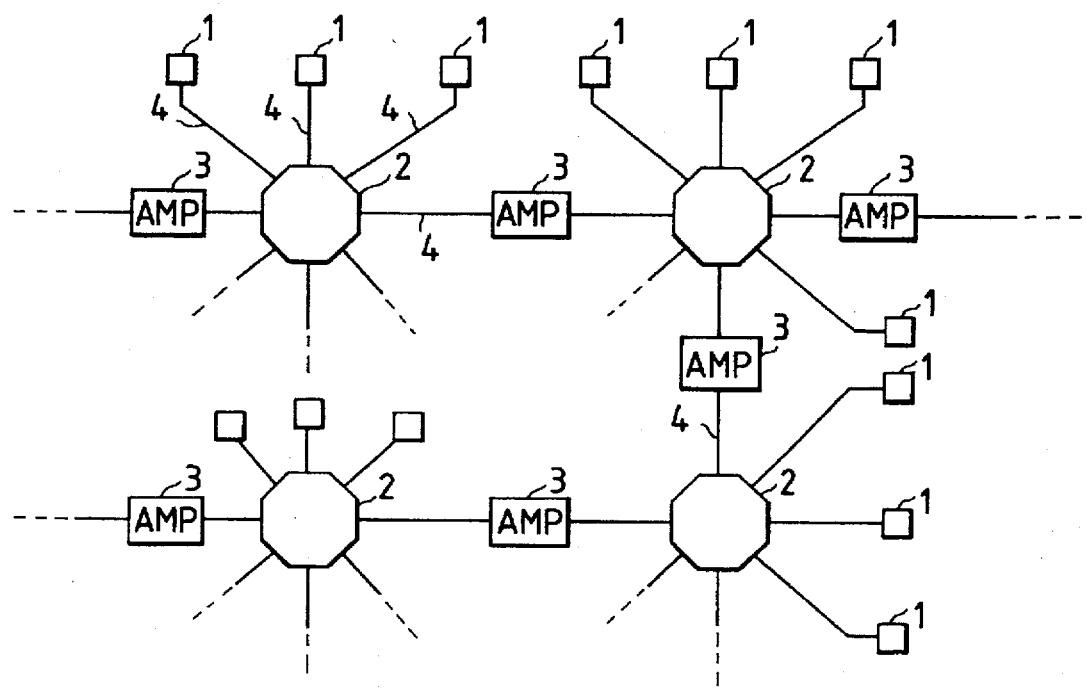
FIG. 4 is a diagram schematically showing an optical communication network according to an embodiment of the present invention.
Figure 5:
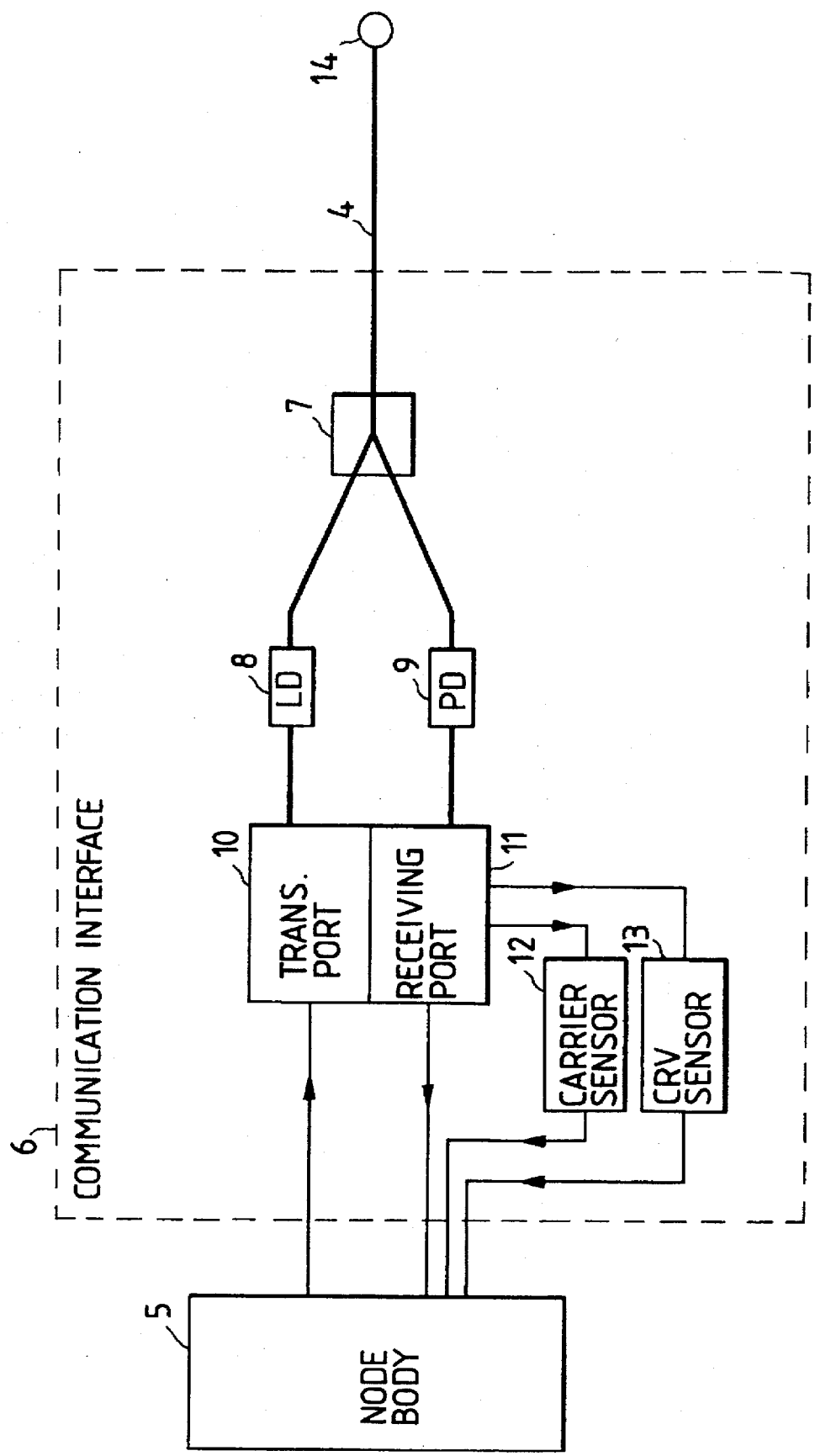
FIG. 5 is a block diagram showing the construction of a node used in the communication network of FIG. 4.
Figure 6:
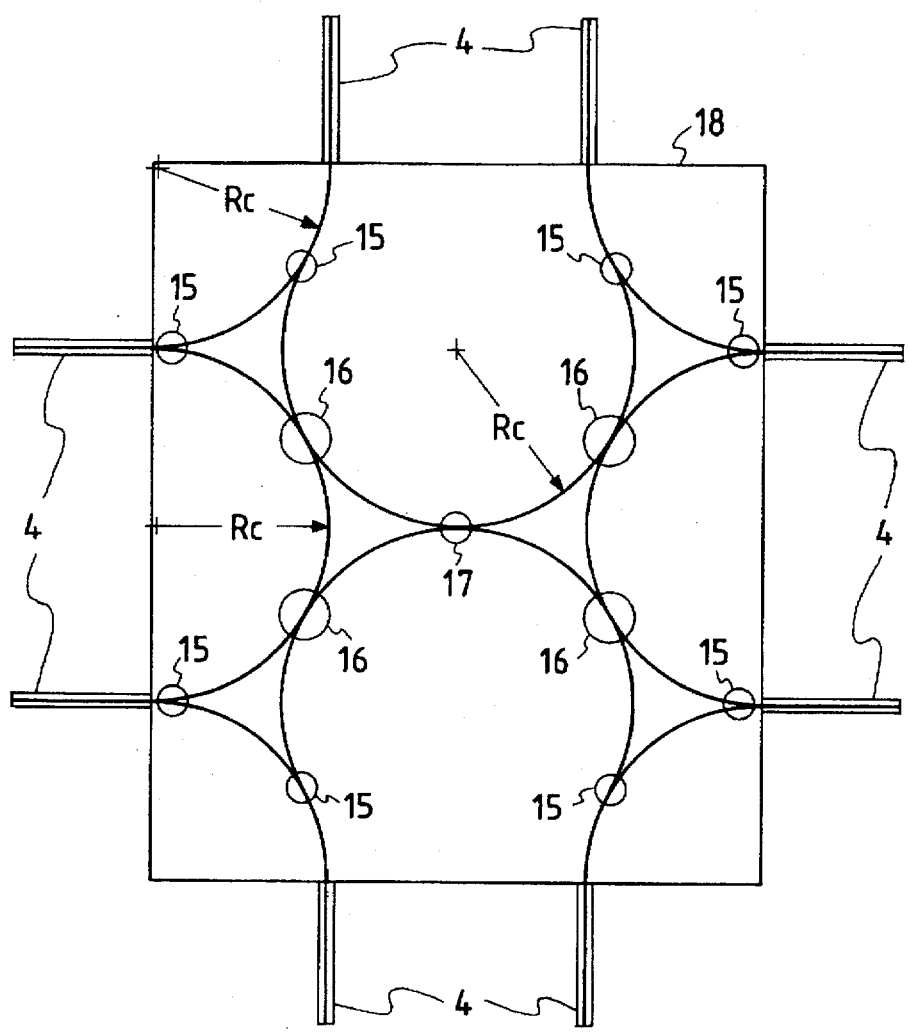
FIG. 6 is a diagram showing the construction of a star coupler with 8 terminals, which is used in the communication network of FIG. 4.

The construction of an interconnectable star coupler with eight (8) terminals, which is used in the communication network of FIG. 4, is illustrated in FIG. 6. The star coupler illustrated may be connected to one or more other star couplers. A substrate 18 is made of glass or polycarbonate. Disposed on the substrate 18 are optical couplers 15 each having a branching ratio of 7:1, optical couplers 16 each having a branching ratio of 2:1, and a optical coupler 17 having a branching ratio of 1:1. Those devices being connected by optical wave guides, thereby forming an integrated optical circuit. In the integrated optical circuit thus formed, desired distribution ratios of light powers are obtained. The multiplexing/demultiplexing device 15 having a branching ratio of 7:1 functions to distribute the light power of 7 to the multiplexing/demultiplexing device 16, and distributes the light power of 1 to other multiplexing/demultiplexing devices. The multiplexing/demultiplexing device 16 having a branching ratio of 2:1 distributes the light power of 2 to the multiplexing/demultiplexing device 17, and the light power of 1 to the multiplexing/demultiplexing device 16. Eight number of optical fibers 4 are connected to the substrate 18. In FIG. 6, Rc represents the radius of curvature of the optical waveguide. For more details of the interconnectable star coupler, reference is made to the specification of the co-pending U.S. patent application Ser. No. 07/813,443, filed by the Applicant of the present patent application.

In the communication network thus constructed, when only one node sends a signal, all other nodes connected to the network can receive the signal. When two nodes simultaneously send signals, one of the sending nodes can correctly receive the signal from the other, and vice versa. The other nodes than the two sending nodes can receive the signals as a jamming signal. In other words, the communication network has the secure function. This arises from the fact that the network is bidirectional. When three or more nodes simultaneously send signals, any node can receive a jamming signal alone. Thus, in the communication network, the secret of communication contents can be observed in a state that when two nodes send signals, one of them sends a signal to the other and vice versa. The details of this is described in Published Unexamined Japanese Patent Application No. Hei. 3-270432.

The construction of another type of node, that may be used for the optical communication network of FIG. 4, will be described. When the nodes to be discussed are applied for the FIG. 4 network, an optical communication network of the multichannel type, which is based on the wavelength multiplexing, can be realized.

As shown, the node includes a node body 5, four communication interfaces 6a to 6c, each having the same construction as the communication interface 6 in FIG. 2, and a wavelength multiplexer 19. In the communication interfaces 6a to 6c, laser diodes as light emitting elements emit light signals of different wavelengths λa to λd. The wavelength multiplexer 19 multiplexes those light signals of the wavelengths λa to λd.

The bidirectional, optical amplifiers 3 in the optical communication network shown in FIG. 4, as recalled, are semiconductor laser amplifiers. In each amplifier, the range of wavelengths that can be amplified is broad, 50 to 70 nm. If the wavelengths λa to λd are selected to be different by 10 nm from one another, one semiconductor laser amplifier is capable of amplifying all of the light signals of the wavelengths λa to λd.

Figure 8:
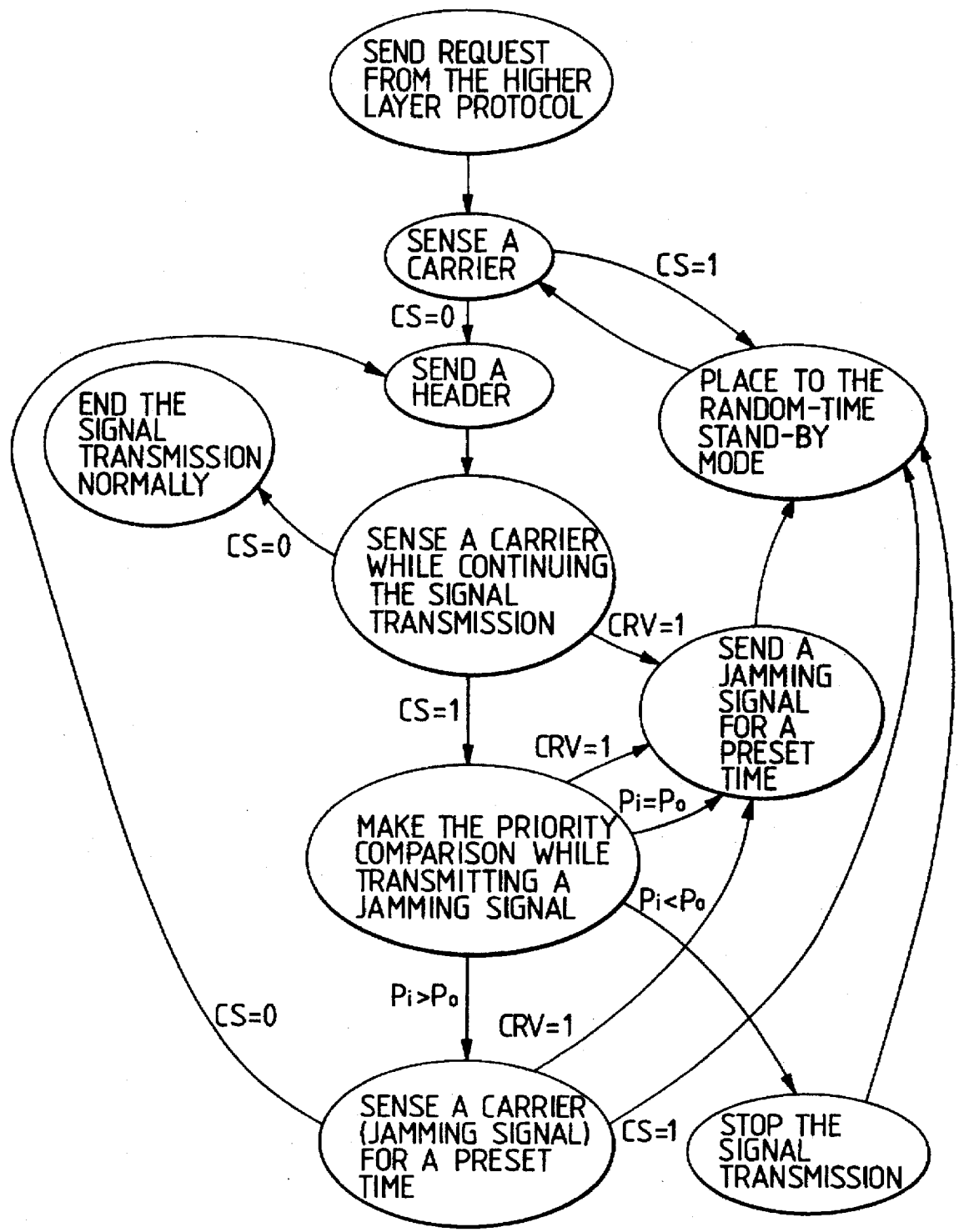
FIG. 8 is a diagram showing a status transition of a sending node in a protocol for avoiding the 2-node collision on a network having a single bidirectional transmission channel.

Some specific examples of communication methods, or protocols, according to the present invention will be described. FIG. 8 is a diagram showing a status transition of a sending node in a first protocol according to the invention. The protocol of FIG. 8, applied for a single transmission channel (broadcasting bus), is designed to avoid the 2-node collision. Variables in FIG. 8 have the following meanings. A variable CS represents presence or absence of a carrier sense. When CS is "1", the carrier is present. When it is "0", no carrier is present. A variable CRV indicates occurrence of the code rule violation. When CRY is "1", the CRV occurs. When it is "0", no CRV occurs. Pi is a priority level of the packet sent by a sending node in the form of a variable. Po is a priority level of the packet sent by a responding node in the form of a variable. Signs ">", "<", and "=" indicate "higher" "lower", and "equal" in the priority level. For example, if Pi >P0, the sending node is higher in priority level than the responding node.

Figure 9:
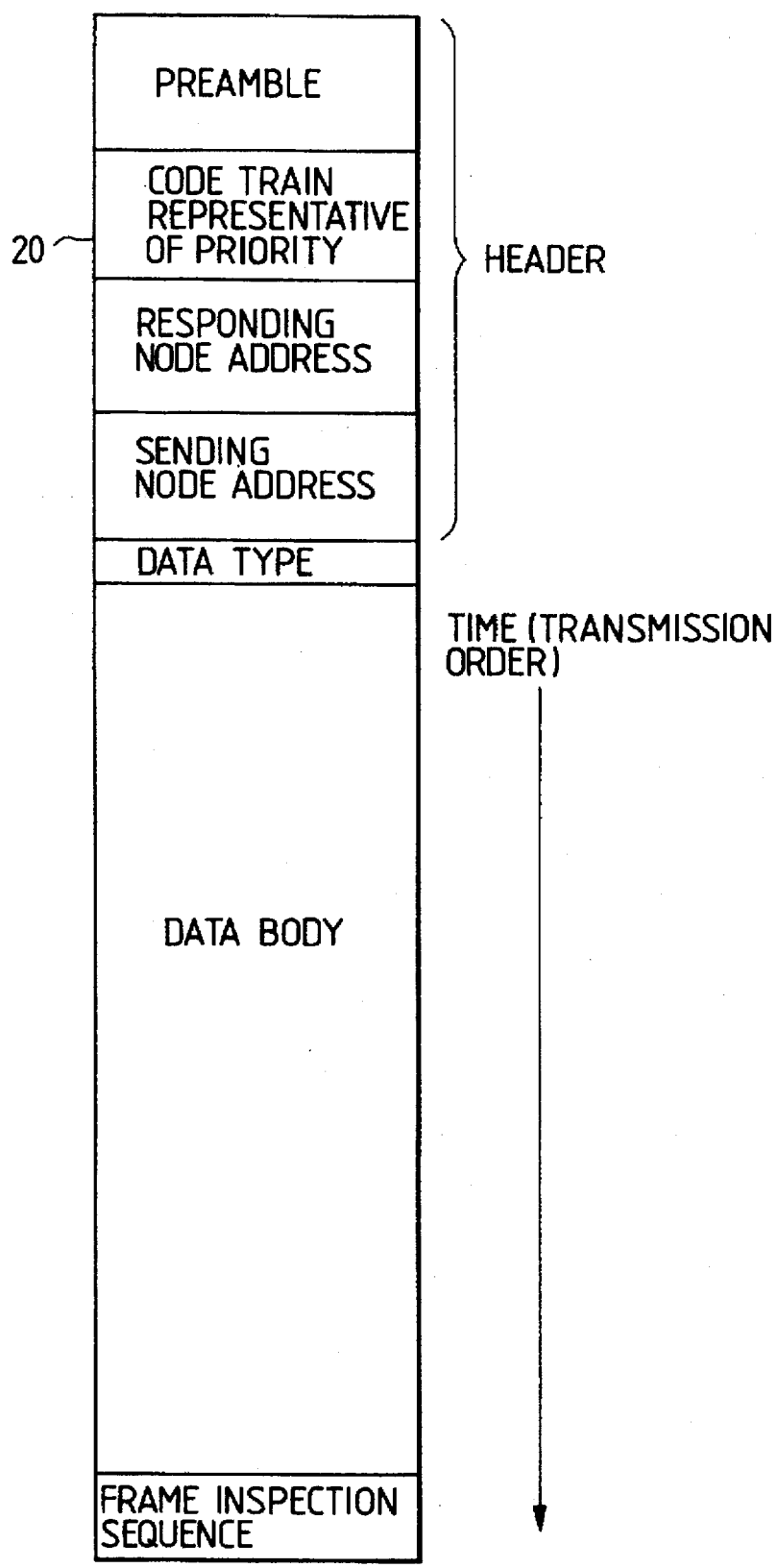
FIG. 9 is a diagram showing the format of a packet used in the protocol of the invention.

When receiving a send request from the higher layer protocol, the node senses a carrier on the transmission channel. When the carrier is sensed (CS=1), the node is placed to the random-time stand-by mode, and then senses a carrier on the transmission channel since presence of the carrier indicates that another node uses the transmission channel. If the carrier is not sensed (CS=0), the node starts to send a signal. When the header of the packet has been sent, the node senses the carrier again while continuing the signal transmission. The packet format is shown in FIG. 9. The carrier sensing operation continues till the signal transmission has normally ended. If carrier is not sensed before the transmission ends (CS=0), the signal transmission has normally ended. If any carrier is sensed before the transmission ends (CS=1), a collision has occurred.

Upon sensing of the carrier (CS=1), the sending node switches the contents of the sending signal to a jamming signal and fetches the sensed signal. The fetched signal contains the header of a packet that is sent from another node.

The structure of the packet is illustrated in FIG. 9. As shown, the header contains a preamble, a code train 20 indicative of priority, an address of the called station, and an address of the calling station. The code train 20 indicative of priority will be described later.

The sending node compares the code train indicative of the fetched-packet priority with the code train of the packet that has sent by the sending node per se. If the priority level of the packet sent by the sending node is higher than that of the fetched packet (pi>Po), the node continues to sense the carrier for a fixed time period while sending the jamming signal. After confirming that the carrier of the ompeted node disappears from the transmission channel (CS=0), the node sends the packet again. When the any carrier does not appear from the transmission channel (CS=1), the nodes is placed to a random-time stand-by mode. If the priority level of the competed station is higher than that of the sending node (Pi<Po), the sending node immediately stops the sending operation and is placed to the random-time stand-by mode. If the priority levels of both stations or nodes are equal to each other (Pi=Po), the node is set to the random-time stand-by mode after the jamming signal is sent for a fixed time period. In the status transition diagram of FIG. 8, the carrier sensing is limited within a fixed period of time as "Carrier sense (jamming signal) within a fixed time period". The reason for this follows. When by some error, two nodes collide with each other, one of the nodes decides that the priority level of the node per se is higher than that of the other, and the other also makes the same decision. As a result, the competition to seize the channel continues on the transmission channel in an endless manner. It is for this reason that the carrier sensing time is limited.

A code system to determine the packet priority in a circulating manner is employed for the code train indicative of packet priority. JANKEN, the game of "scissors, "paper", and "stone", will assist your understanding of the code train. (See Appendix A of the following paper: Yasumoto et al., "PROSPEX: A Graphical LOTOS Simulator for Protocol Specification with N Nodes" IEICE Trans. Commun. Vol. E 75∝8, No. 10, pp 1015–1023 (1992)) Two (2) bits provide four combinations of "00", "01", "10", and "11". Of the four combinations, three combinations "00", "01", and "10" are assigned to "stone", "paper", and "scissors", respectively. "01" is prior to "00"; "10", to "01"; and "00", to "10". In this way, the priority level is determined in a circulating manner. In other words, the packet priority is relatively determined.

In the embodiment of the invention, 24 number of 2-bits codes (totally 48 bits) are arranged. The priority is successively determined by comparing firstly the first code with the second code, secondly the second code with the third code, and so on. The priority is given to the code having first won. The probability that 24 code trains are all at the same priority level is $(1/3)^{24}=3.5\times10^{-12}$. Practically, the event of the probability will little occur. The priority determining method can give impartially the rights to use the channel to the nodes.

JANKEN, which consists of only three combinations, "stone", "scissors", and "paper", may be modified such that "11" is additionally applied as the fourth hand to JANKEN, and "11" is prior to the remaining combinations, "00", "01", and "10". From the top of the code trains indicative of priority, "11" is arranged succeeding to them. The number of successions of "11" indicates the absolute priority of the packet. The absolute priority is given to the packet under a predetermined rule, in consideration of the nature or the contents of the packet.

In the description thus far made, there is no guarantee of successful communication that when three or more nodes collid. Accordingly, when the multiple-collision occurs, it is necessary to take such a control procedure that the random-time stand-by mode follows the transmission of a jamming signal for a preset time period (as in the normal protocol of CSMA/CD). The multiple-collision can be detected by sensing occurrence of the code rule violation.

In the status transition diagram of FIG. 8, when a code rule violation occurs (CRV=1) in the status of "Sense the carrier while sending a signal", "Make the priority comparison while sending a jamming signal" or "Carrier (jamming signal) sense for a preset time", such a control procedure is taken.

The responding node constantly monitors the transmission channel. When recognizing a packet directed to the receiving mode per se, it receives the packet and sends it to the higher layer protocol. A status transition of the responding node in the first protocol is simple, and hence the status transition diagram is omitted here.

Figure 10:
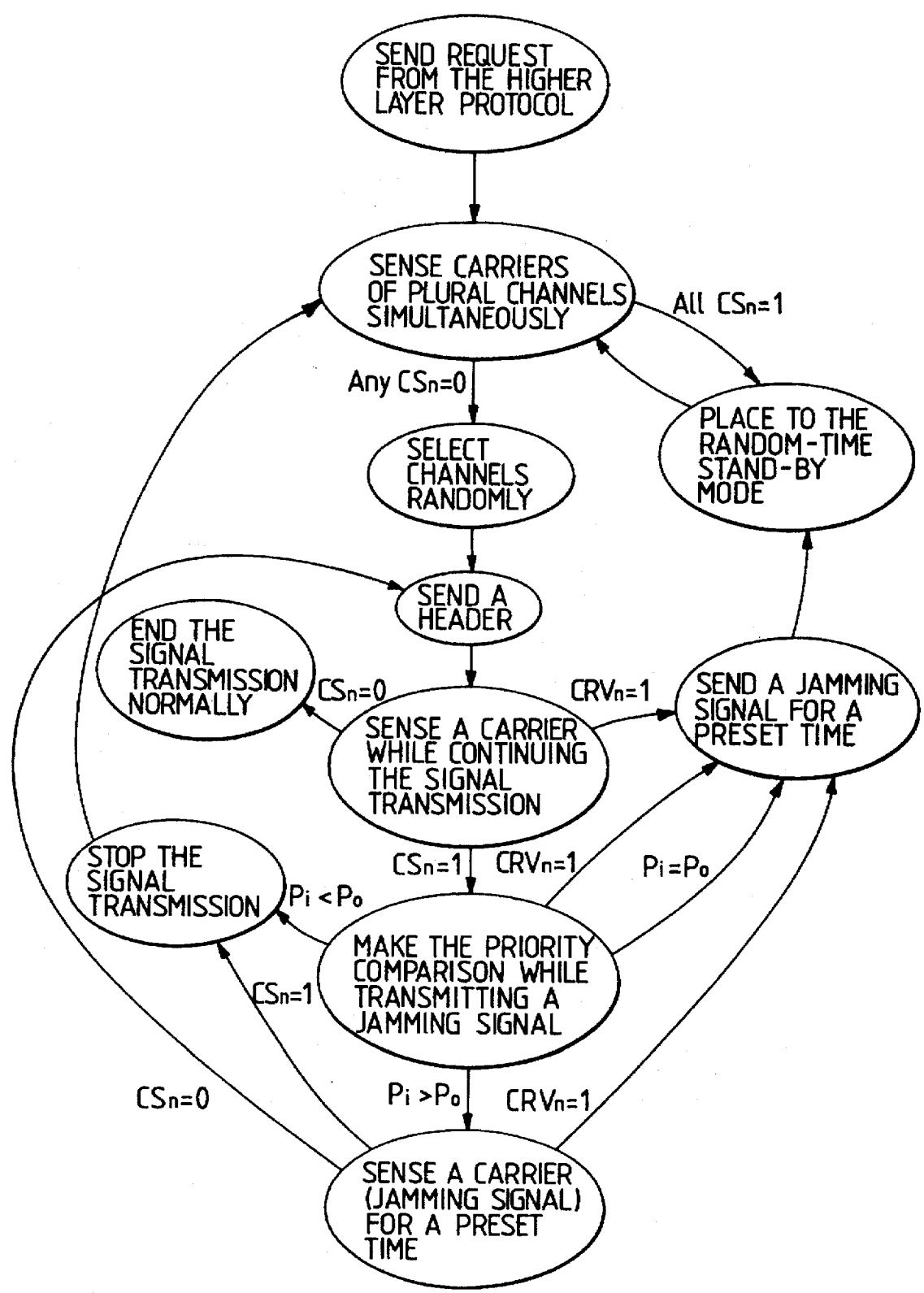
FIG. 10 is a diagram showing a status transition of a sending node in a protocol for avoiding the 2-node collision on a network having a multiple of bidirectional transmission channels.

Another communication method, or a second protocol, of the invention will be described. A status transition of a transmitting node in the second protocol is illustrated in FIG. 10. The second protocol is applied to a communication network of which the nodes are of the type shown in FIG. 7, and parallel transmission channels are arranged in parallel on the basis of the wavelength multiplexing. The status transition diagram of FIG. 10 is different from that of FIG. 8 in that a status "Random channel select" is additionally used.

When a send request is received from the higher layer protocol, the sending node simultaneously senses the carriers of the plural channels, and randomly selects one of idle channels and starts to send a signal through the selected idle channel. The control procedure of the second protocol is substantially equal to that shown in FIG. 8 except the processing to be performed when the node is inferior as the result of priority comparison. In the status transition of FIG. 8, the sending node immediately stops the transmission and is set to the random-time stand-by mode. In the status transition of FIG. 10, immediately after the transmission is stopped, the sending node simultaneously senses the carriers of the channels. If there is an idle channel, the sending node selects it and sends a signal through the selected channel. If there are plural idle channels, the node randomly selects one of the idle channels, and uses it for signal transmission. With provision of the control procedure, if there is an idle channel, the node who was defeated in the line competition can send a signal through the idle channel without idle waiting.

Accordingly, the delay time required for the communication can be reduced. In FIG. 10, the carrier sense is expressed by a variable of CSn where n indicates the transfer channel number. In the status of "Carrier sense for a preset time", if CSn=1, the procedure returns to the carrier sense. This is done in order to avoid such a situation that by some error, the line competition endlessly continues. In the instant protocol, the network to which the protocol is applied contains a plural number of channels. Accordingly, the node operation does not enter the random-time stand-by mode, but searches for an idle channel or channels.

In the second protocol, the responding node sometimes receives a plural number of packets in a simultaneous way. Therefore, the through-put must be correspondingly increased. Except this, the control procedure of the protocol of the responding node is substantially the same as that in the first protocol.

In the communication network, the wavelength multiplexing technique is used for forming the multi-channel arrangement consisting of a multiple of bidirectional transmission channels. The technique disclosed in the co-pending U.S. patent application Ser. No. 07/946,192 may be used for the same purpose, in place of the wavelength multiplexing. It is evident that the second protocol may be applied for the communication network described in the specification of the above patent application.

Figure 11:
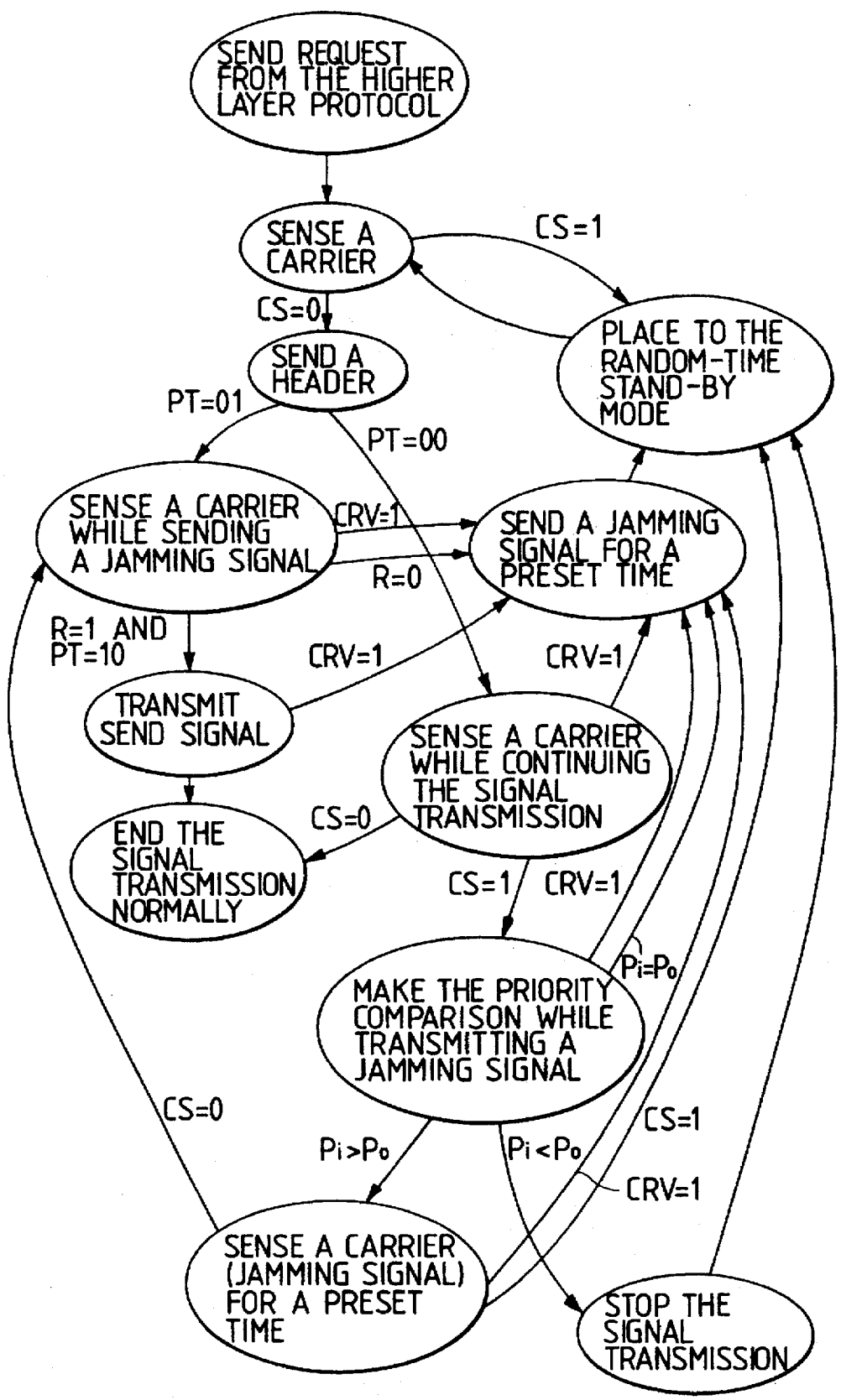
FIG. 11 is a diagram showing a status transition of a sending node in a protocol for avoiding the 2-node collision and for secure communication on a network having a single bidirectional transmission channel.
Figure 12:
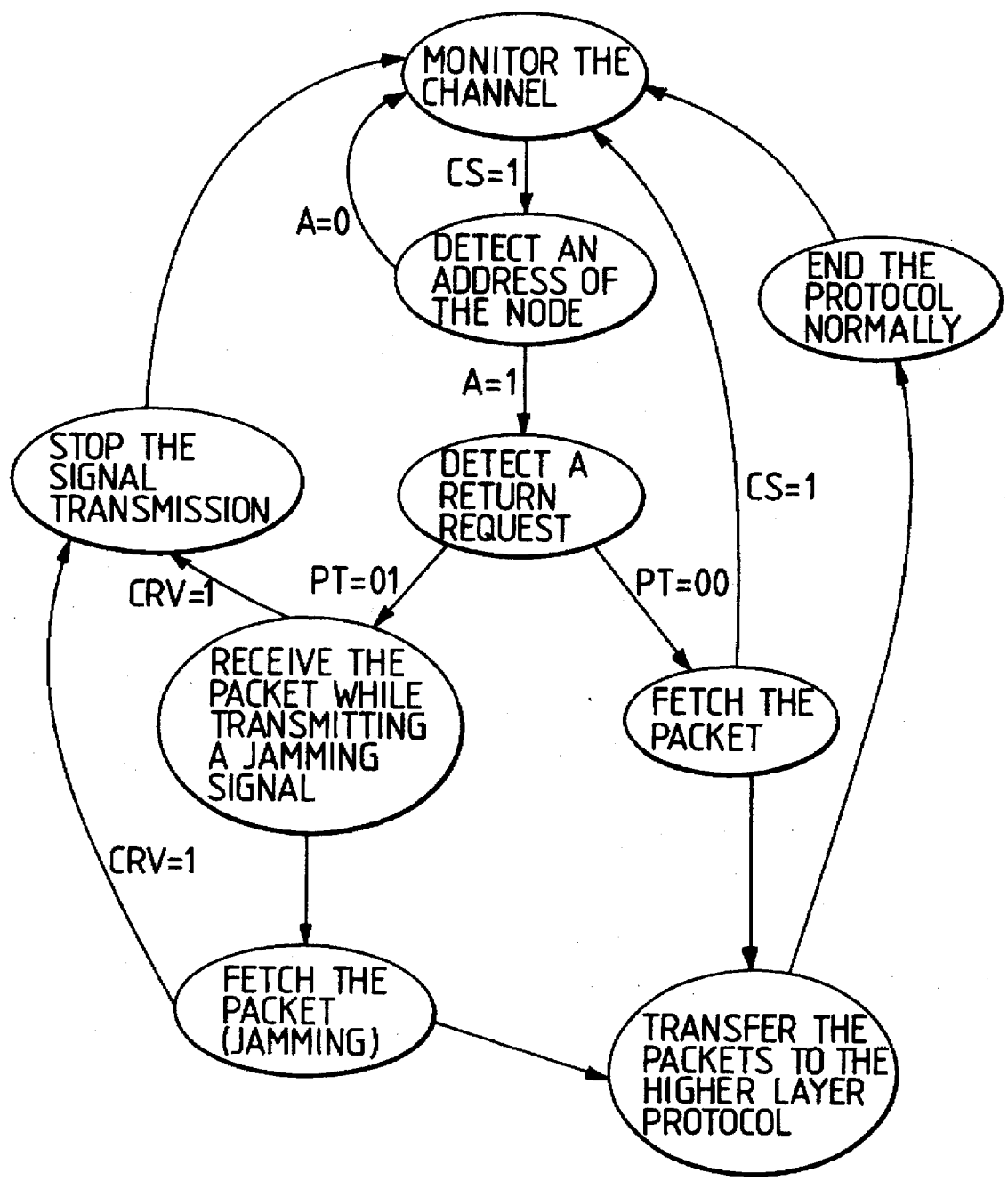
FIG. 12 is a diagram showing a status transition of a responding node in the protocol for avoiding the 2-node collision and for secure communication on a network having a single bidirectional transmission channel.
Figure 13:
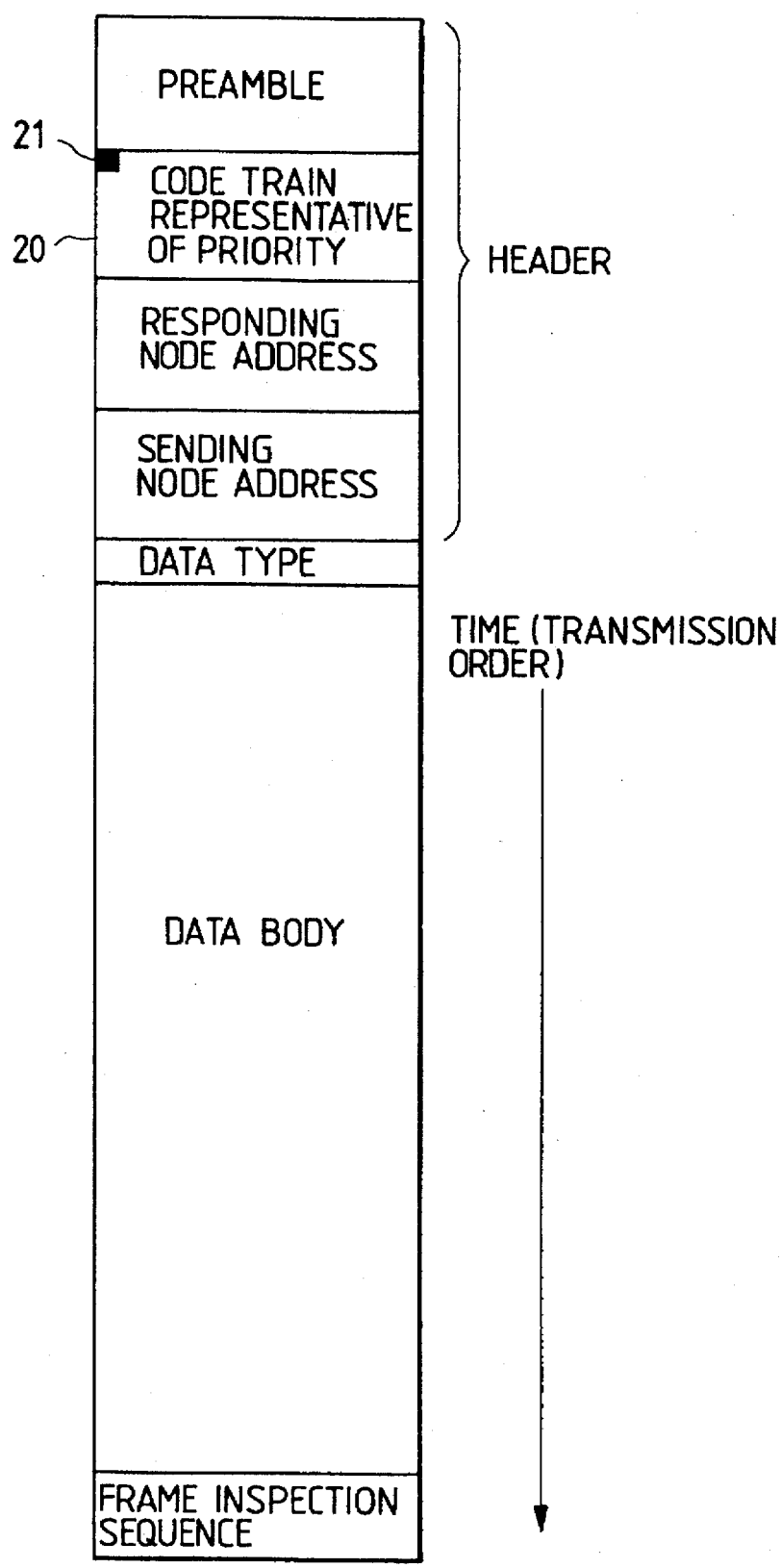
FIG. 13 is a diagram showing a packet format equivalent to the packet format of FIG. 9 which additionally uses a sign indicative of a packet type.

A third protocol of the invention will be described. The third protocol is equivalent to the first protocol which additionally uses a control protocol for secure communication. FIG. 11 is a diagram showing a status transition of the sending node in the third protocol. FIG. 12 is a diagram showing a status transition of the responding node in the third protocol. The structure of a packet in the third protocol is somewhat different from the packet structure (FIG. 9) in the first and second protocols. As shown in FIG. 13, a sign 21 representative of the type of a packet is additionally contained in the header of the packet. The sign 21 consists of two bits. The code train 20 indicative of priority consists of 46 bits (23 number of 2-bits pairs). The packet type PT is: "00" for the normal packet, "01" for the packet of the sending node in the secure communication, and "10" for a response packet of the responding side in the secure communication. "11" is not defined. In FIGS. 11 and 12 showing status transition diagrams, PT is a variable representing the packet type. R is a variable which is set to "1" when the address of the sending node (or sender), from which the received packet originates, is coincident with the address of the responding node or responder. When the addresses of the sender and responder are not coincident, the variable R is set to "0". A is a variable which is set to "1" when the address of the node, to which the received packet is destined, is coincident with the address of the sending node, and to "0" when the addresses are not coincident with each other.

The status transition diagram shown in FIG. 11 is based on that of FIG. 8. The control procedure for the normal packet after transmission of the header has been completed is different from that for the secure communication. The control procedure for the normal packet (PT=00) resembles the procedure as described in the status transition diagram of FIG. 8. In the control procedure for the secure communication (PT=01), the sending node sends a jamming signal immediately after the completion of the header transmission. In this mode, the transmission is permitted only when the address of the sender is coincident with that of the responder (R=1) and PT (packet type)=10. When the address of the sender, from which the packet is received, is not coincident with the address of the responder (R=0), the random-time stand-by mode is set up after the jamming signal is sent for a preset time. Also when CRV=1 in the processings of "Sense a carrier while sending a jamming signal" and "Sending" (FIG. 11), the random-time stand-by mode is set up after the jamming signal is sent for a preset time.

The responding node or responder operates for procedural control as described in a status transition diagram shown in FIG. 12. As shown, the responder monitors the transmission channel, receives a carrier (CS=1), and detects the address of the node, to which the received packet is destined. When the detected address is not coincident with the address of the responder (A=0), the responder returns to the channel monitoring job. When those addresses are coincident (A=1) with each other, it detects the type of the return request, or the packet type. When the packet is of the normal type (PT=00), it fetches the packets so long as the carrier is sensed (CS=1), and it transmits the packets to the upper layer protocol and ends the receiving protocol procedure.

When the addresses of the sender and the responder are coincident with each other (A=1) and PT (packet type)=1 (secure communication mode), the node starts the transmission of the jamming signal, and fetches the packet while transmitting the jamming signal, and transfers the packet to the upper layer protocol. When the code rule violation occurs (CRV=1) during the transmission of the jamming signal, it immediately stops the transmission of the jamming signal.

According to the secure communication protocol, since the node with which the sending node communicates supplies the jamming signal, the 2-node collision is intentionally caused to occur on the transmission channel. As a result, secrecy of the communication between the two nodes can be protected against the other nodes than the above two nodes.

Figure 14:
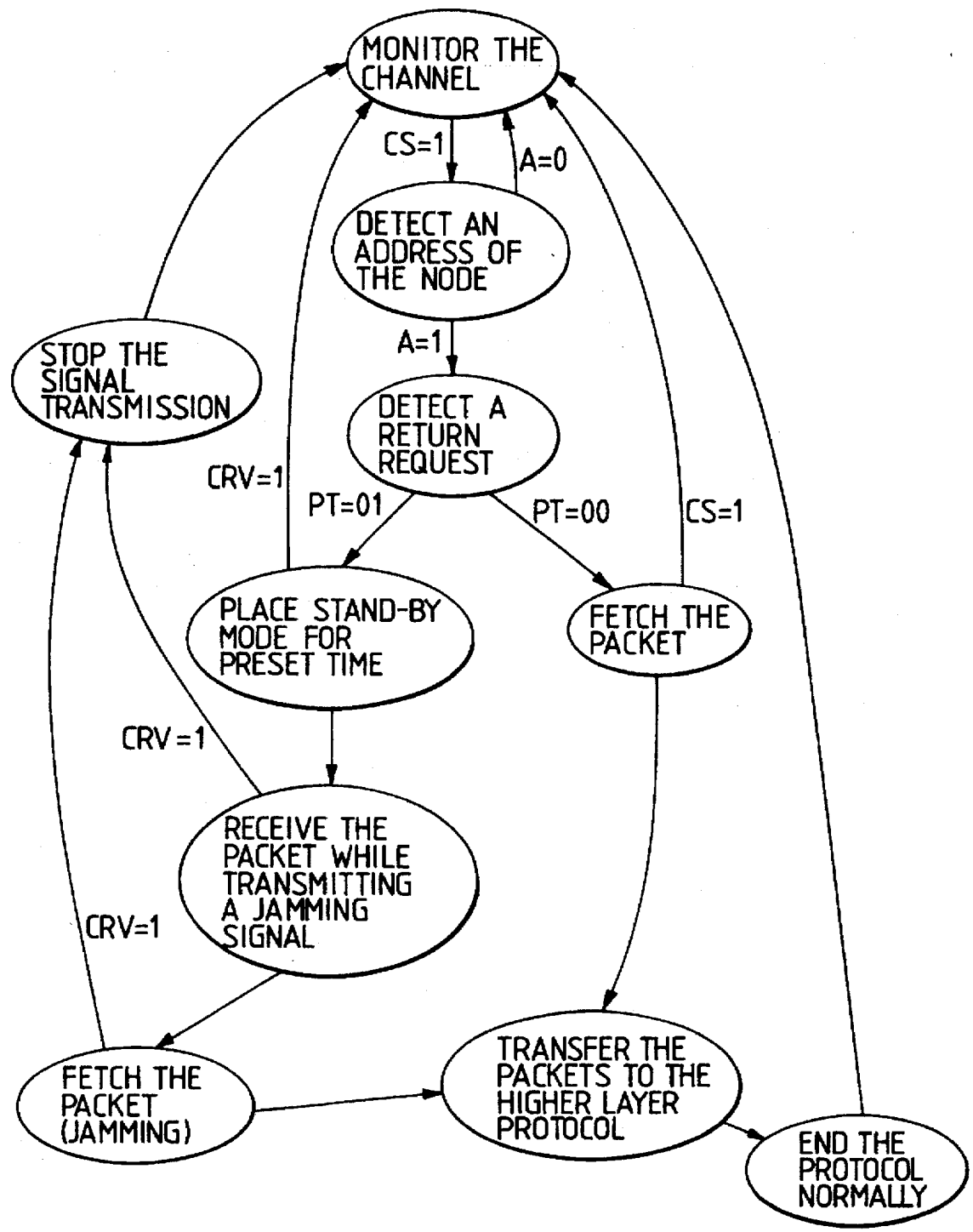
FIG. 14 is a diagram showing a status transition of a responding node in the protocol for avoiding the 2-node collision and for secure communication, the status transition being featured by provision of a preset waiting time in the response of the node.

The fourth protocol of the invention is a modification of the third protocol. In the third protocol, the 2-node collision is forcibly caused to occur. This leads to increase of a probability of occurrence of 3-node collision. The increased probability of the 3-node collision occurrence impairs the advantageous function of the 2-node collision avoiding mechanism. In the fourth protocol, the responding node starts to send a signal after time approximate to the go/return delay time elapses, viz., it does not return a signal immediately after the packet is received. With additional use of the procedure, the probability of the 3-node collision occurrence can be kept low and the advantageous function of the two-node collision avoiding mechanism can be kept as it is. A status transition diagram of the responding node in the fourth protocol is shown in FIG. 14. A status transition diagram for the sender in the protocol is the same as that of FIG. 11.

The status transition diagram of FIG. 13, which is based on that of FIG. 12, is different from the latter in that a job of "Wait for a preset time" is additionally used located between jobs "Return request sense" and "Receive a signal while transmitting a jamming signal".

Figure 15:
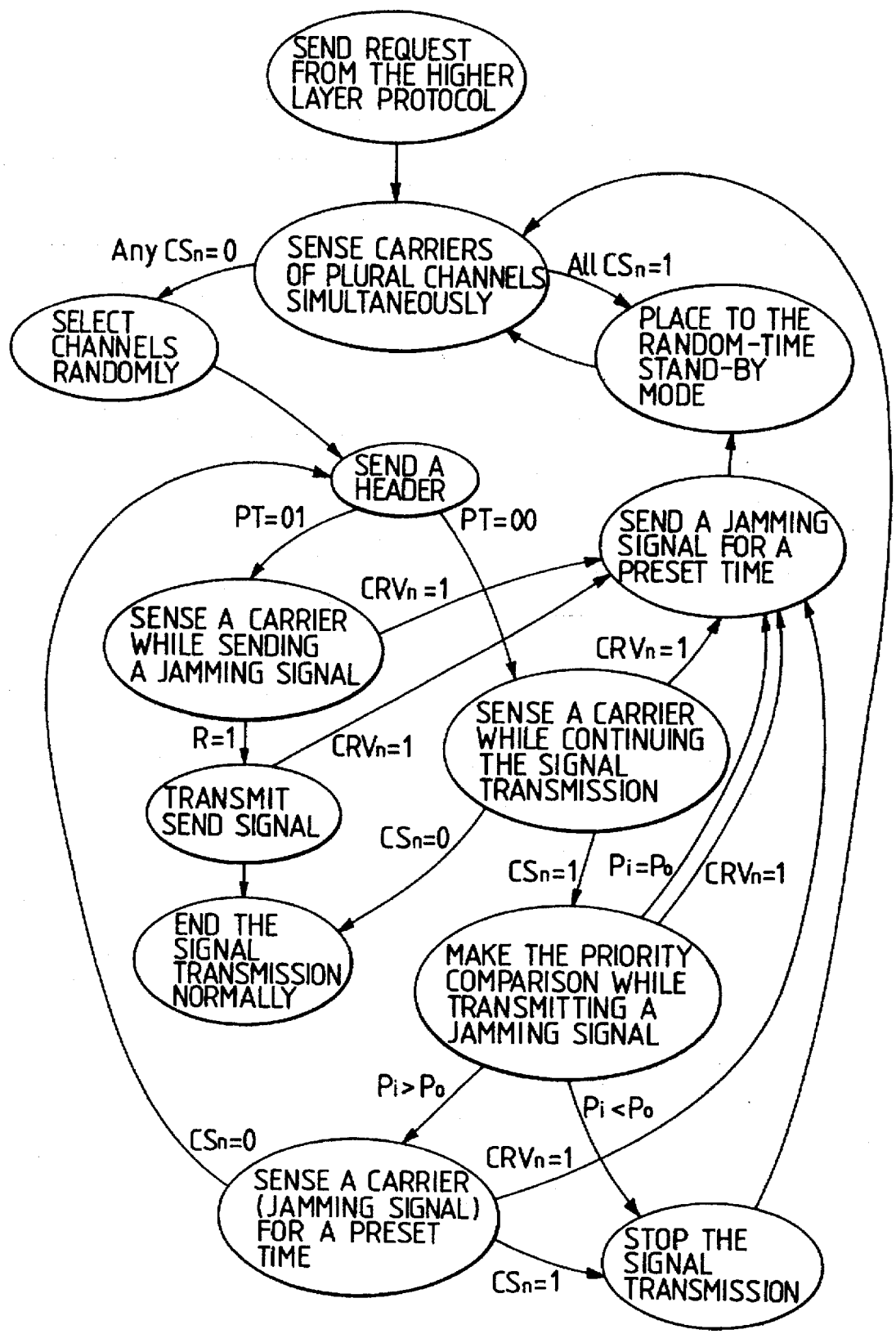
FIG. 15 is a diagram showing a status transition of a sending node in a protocol for avoiding the 2-node collision and for secure communication on a network having a multiple of bidirectional transmission channels.

The fifth protocol of the invention is equivalent to the second protocol for multichannel which additionally uses a control procedure for secure communication in the third protocol. In other words, the fifth protocol is provided with all of functions thus far referred to. FIG. 15 is a status transition diagram for the sender in the protocol having both the function of 2-node collision avoidance and the function of secure communication. The status transition diagram of FIG. 15 is the combination of the FIGS. 10 and 11 status transition diagrams respectively for the second and third protocols. Accordingly, no further description of the FIG. 15 status transition diagram will be given here. The control procedure in the status transition diagram of FIG. 12 or 14 is available for the control procedure of the responder in the fifth protocol.

As seen from the foregoing description, in the optical communication network, the type of collision, 2-node collision or multiple-node collision, is discriminated. The control procedure for the 2-node collision or for the multiple-node collision is selectively used according to the result of discrimination. As a result, the 2-node collision can effectively be avoided, the communication channels can be efficiently used, and the delay times required for the packet transmission can be reduced in average.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

A first embodiment of a wavelength multiplexing transceiver for the wavelength multiplexing in an optical communication network described above is shown in FIG. 16. The first embodiment is a wavelength multiplexing transceiver for optical communication in which four wavelengths are multiplexed. The wavelength multiplexing transceiver is comprised of an integrated optical circuit substrate 101 containing integrated optical waveguides, a diffraction grating substrate 104 located on the bottom side (viewed in the drawing) of the integrated optical circuit substrate 101, a photo diode array 105 as a light sensing array, a semiconductor laser array 106, and an optical fiber 110 for input/output for light signals. The photo diode array 105, the semiconductor laser array 106, and the optical fiber 110 are disposed on the top side (viewed in the drawing) of the integrated optical circuit substrate 101.

The integrated optical circuit substrate 101 is a glass substrate in this embodiment. A first slab waveguide 102 for transmission, a second slab waveguide 103, a first optical coupler 107, a second optical coupler 108, and wiring optical waveguides 109a to 109k are formed on the integrated optical circuit substrate 101 by metal ion diffusion process. For the waveguide formation by the metal ion diffusion process, reference is made to E. Okuda, I. Tanaka, and T. Yamasaki: "Planar gradient—index glass waveguide and its applications to a 4-port branched circuit and star coupler", Appl. Opt. 23, p 1745 (1984). The wiring optical waveguides 109a to 109k have each 10 μm in diameter, and its waveguide mode is a single mode. The first slab waveguides 102 and 103 are each 10 μm thick. The size of the integrated optical circuit substrate 101 is: L1=50 mm and L2=40 mm.

A couple of Fresnel reflecting mirrors 104a and 104b as spectroscoping means are formed on the diffraction grating substrate 104, which is located on the bottom side of the integrated optical circuit substrate 101. The Fresnel reflecting mirrors 104a and 104b are disposed corresponding to the first slab waveguide 102 and second slab waveguide 103, respectively. The first slab waveguide 102 and the Fresnel reflecting mirror 104a make up a first wavelength multiplexer of the slab waveguide type. The second slab waveguide 103 and the Fresnel reflecting mirror 104b make up a second wavelength multiplexer of the slab waveguide type. The construction of the first wavelength multiplexer is preferably the same as that of the second wavelength multiplexer. Those multiplexers have not always the same shape, but it is only needed that both the multiplexers have the same structure as viewed in the cross sectional direction.

The semiconductor laser array 106, provided on the bottom side of the integrated optical circuit substrate 101, is disposed at the location closer to the first slab waveguide 102. In the instant embodiment, since four wavelengths are multiplexed, five semiconductor laser elements 106a to 106e are contained in the laser array 106. Those laser elements 106a to 106e are arrayed at pitches of 100 μm. The number of required laser elements is the number of multiplexed wavelengths+1. The laser element 106e of those elements, which is located closest to the second slab waveguide 103, serves as a common semiconductor laser element. One of the major sides of the laser array 106 is covered with a anti-reflection coat. When mounted, the anti-reflection coat side of the laser array 106 faces the integrated optical circuit substrate 101.

The first slab waveguide 102 and the laser array 106 with the anti-reflection coat are interconnected with a group of wiring optical waveguides 109a to 109e, of which end face pitch is 100 μm. The first slab waveguide 102 and the Fresnel reflecting mirror 104a cooperate to form a polychrometer. The four wiring optical waveguides 109a to 109d, arrayed at equal pitches, are connected to the first slab waveguide 102, thereby to form a polychrometer output 114.

A common output 113 is disposed at the location substantially in opposition to the polychrometer output 114 on the top side of the first slab waveguide 102. The common output 113 is connected to the first optical coupler 107. A first branch of the first optical coupler 107 is connected through the wiring optical waveguide 109e to the common laser element 106e of the laser array 106. A second branch of the first optical coupler 107 is connected through the wiring optical waveguide 109f to the second optical coupler 108. The common terminal of the second optical coupler 108 is connected to the optical fiber 110.

The focal distance of the Fresnel reflecting mirror 104a is 15 mm. A distance A between the center of the mirror 104a and the image forming plane (polychrometer output 114) is 30 mm. A dispersion at the image forming plane (polychrometer output 114) is 100 nm (with respect to the center wavelength of 800 nm) per 1 mm. The wiring optical waveguides 109a to 109d, arrayed at 100 μm pitches, are connected to the polychrometer output 114 of the first slab waveguide 102. Accordingly, a laser oscillation occurs where wavelengths are multiplexed at 10 nm pitches. In this instance of the embodiment, the array pitch of the laser array 106 is coincident with the wiring optical waveguide pitch of the polychrometer output 114. If required, those are not coincident with each other.

The laser array 106, the first slab waveguide 102, nd the Fresnel reflecting mirror 104a make up a wavelength multiplexing resonance optical system, which generates wavelength-multiplexed laser light. In the optical system, the common laser element 106e is coupled, with difference wavelengths, with the remaining laser elements 106a to 106d through the Fresnel reflecting mirror 104a, so that laser oscillation occurs at the respective wavelengths. In more particular, the common laser element 106e and the laser element 106a are coupled with each other, with a wavelength $\lambda 1$, through an optical path including the wiring optical waveguide 109e, the first slab waveguide 102, the Fresnel reflecting mirror 104a, the first slab waveguide 102, and the wiring optical waveguide 109a. The common laser element 106e and the laser element 106b are coupled with each other, with a wavelength $\lambda 2$, through an optical path including the wiring optical waveguide 109e, the first slab waveguide 102, the Fresnel reflecting mirror 104a, the first slab waveguide 102, and the wiring optical waveguide 109b. The wavelength is determined depending on the positional relationship of the common laser element 6e and the remaining laser elements 106a to 106d to the Fresnel reflecting mirror 104a. For the details of this, reference is made to Japanese Patent Application No. Hei. 3-251677.

The laser light generated at the multiplexed wavelength is output from the common output 113. The laser light output from the common output 113 of the first slab waveguide 102 is branched by the first optical coupler 107. Part of the laser light is output through the second optical coupler 108 to the optical fiber 10.

The second slab waveguide 103 and the photo diode array 105 are connected to each other by the wiring optical waveguides 109h to 109k. The second slab waveguide 103 and the Fresnel reflecting mirror 104b make up a polychrometer. Four photo diodes (not shown), corresponding to the number of wavelengths are arrayed in the photo diode array 105. The array pitch of the photo diode array 105 is 100 μm. A common input 115 of the second slab waveguide 103 and the second optical coupler 108 are connected by the wiring optical waveguide 109g. The wiring optical waveguides 109h to 109k are connected to the output 116 of the polychrometer of the second slab waveguide 103.

The focal distance of the Fresnel reflecting mirror 104b is 15 mm. A distance A between the center of the mirror 104b and the image forming plane (polychrometer output 116) is 30 mm. A dispersion at the image forming plane (polychrometer output 116) is 100 nm (with respect to the center wavelength of 800 nm) per 1 mm. The wiring optical waveguides 109h to 109k, arrayed at 100 μm pitches, are connected to the polychrometer output 116 of the second slab waveguide 103.

A light signal coming in through the optical fiber 110 from external is branched by the second optical coupler 108. Part of the light signal is split and imaged by the Fresnel reflecting mirror 104a. The split light signals of different wavelengths pass through the wiring optical waveguides 109h to 109k and reach the photo diodes (not shown) of the photo diode array 105, where those signals are converted into electrical signals.

In the embodiment as mentioned above, the modulator/ solid laser array combination may be used in place of the laser array 106. Further, a solid optical laser amplifier formed by doping the glass substrate with rare earth element may be used. A proper relay optical system may be inserted between the photo diode array 105 and/or laser array 106 and the integrated optical circuit substrate 101. The photo diode array 105 may be replaced with another suitable light sensing element capable of converting light signals into electrical signals.

As described above, the spectroscoping systems for transmission and reception have the same structures as viewed in the cross sectional direction of the integrated optical circuit substrate 101. Therefore, when manufacturing the wavelength multiplexing transceiver, the transmitting and receiving portions can be manufactured in the same manufacturing process. In this respect, the manufacturing process is simplified.

A second embodiment of the invention is illustrated in FIG. 17. FIGS. 17(a) and 17(b) are a plan view and a side view showing the second embodiment. The difference of the second embodiment is different from the first embodiment of FIG. 16 in that concave gratings 111a and 111b are used in place of the Fresnel reflecting mirrors 104a and 104b. The concave gratings 111a and 111b are formed in a manner that the integrated optical circuit substrate 101 made of glass is dry-etched to shape a saw-tooth grating 112 in a concave. Accordingly, in the second embodiment, the number of required components is reduced by one when comparing with the first embodiment. In the concave gratings, since 500 gratings/mm, the grating pitch is 2 µm. The radius of curvature (Rowland radius) R of the concave grating is 15 mm. A refractive index of the integrated optical circuit substrate 101 is approximately 1.5. A dispersion on the image forming plane (polychrometer output 114 or the polychrometer output 116) is 100 nm (with respect to the center wavelength of 800 nm) per 1 mm.

Figure 18:
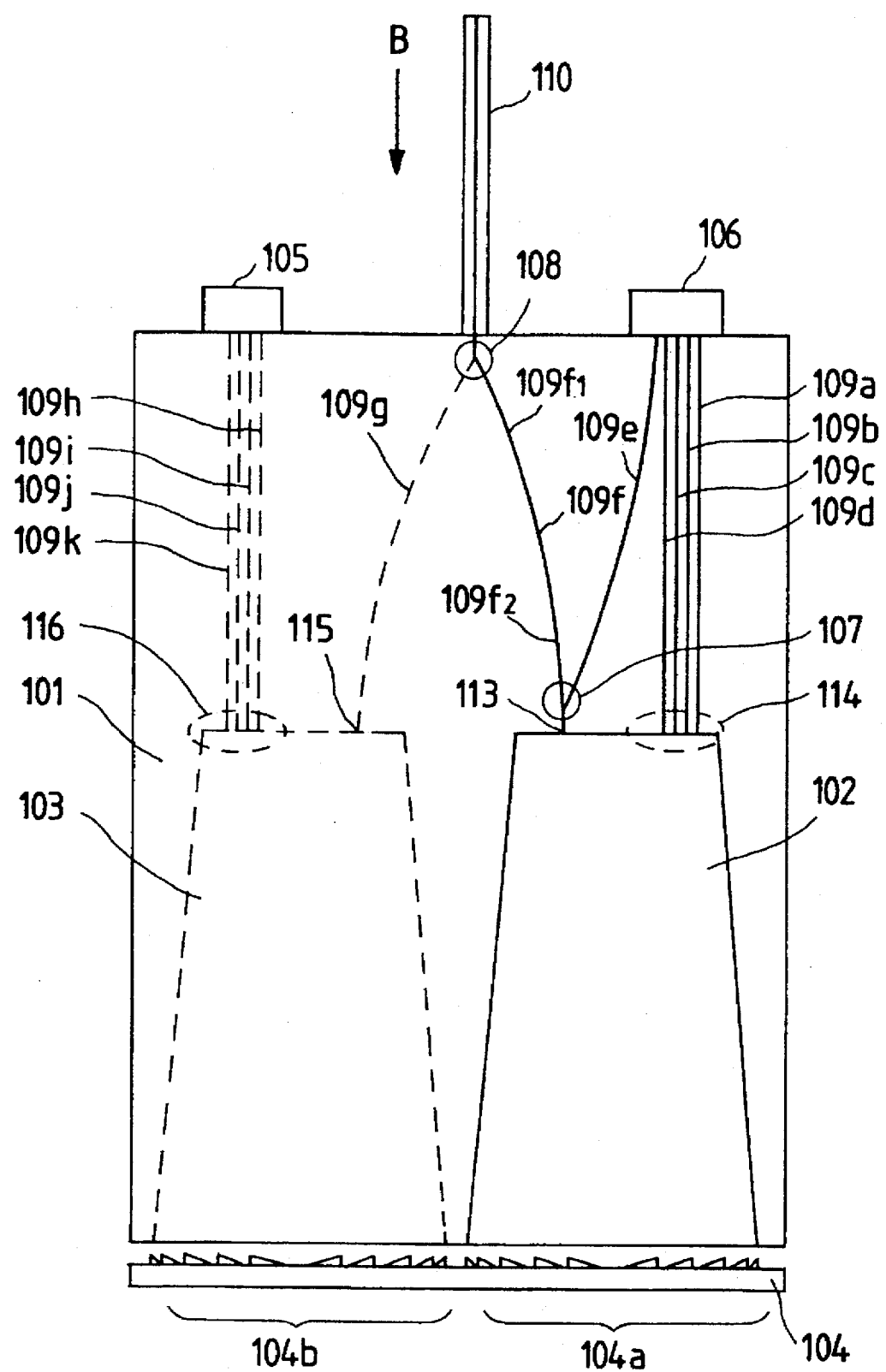
FIG. 18 is a diagram showing a third embodiment of a wavelength multiplexing transceiver for the wavelength multiplexing in an optical communication network.
Figure 19:
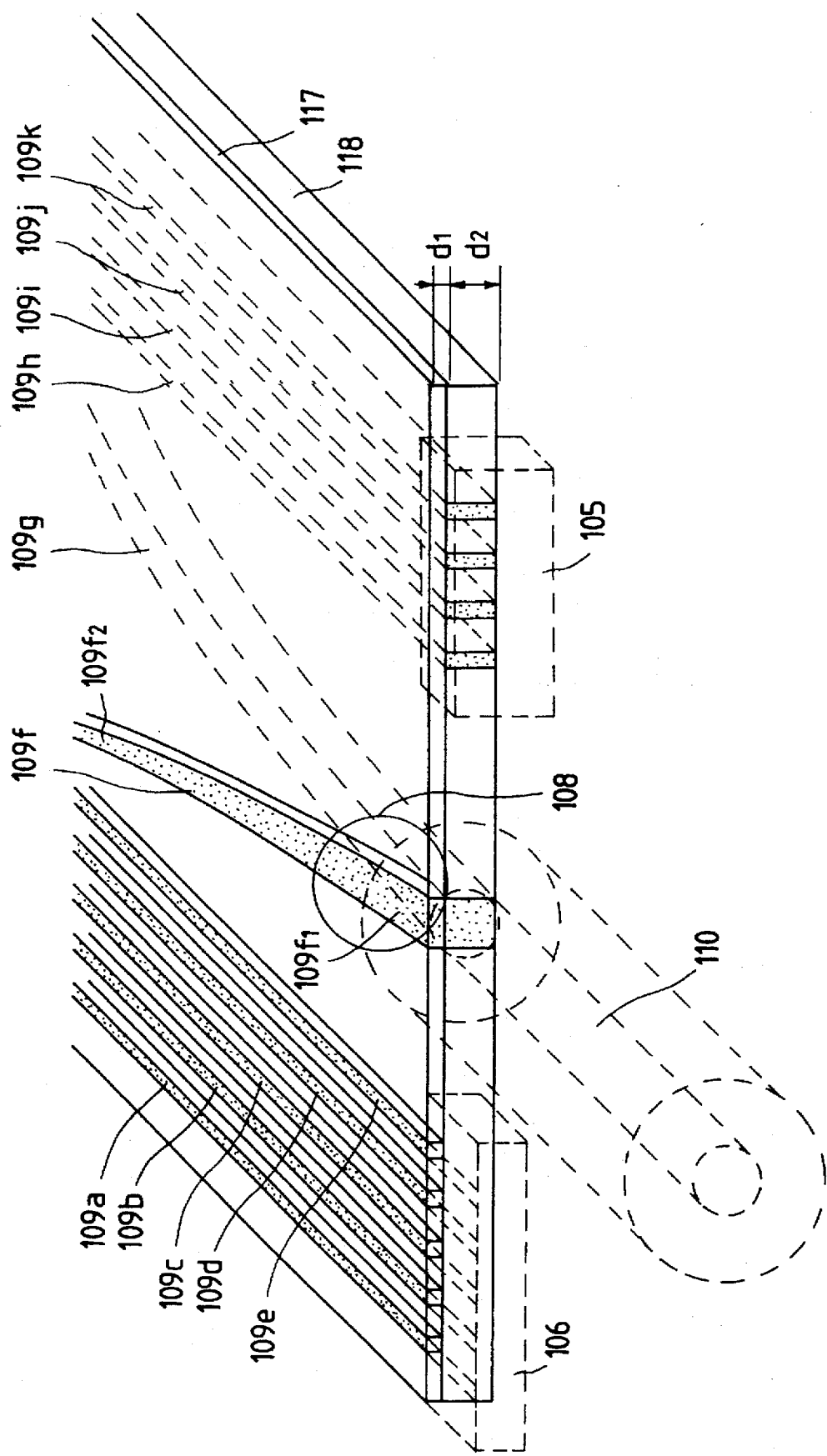
FIG. 19 is a schematic diagram showing a perspective view of the wavelength multiplexing transceiver shown in FIG. 18.

A third embodiment of the invention is illustrated in FIGS. 18 and 19. In the third embodiment, the invention is applied to a wavelength multiplexing transceiver for optical communication of which the waveguide mode is a multimode.

Since the core diameter of the multimode optical fiber is 50 µm, the optical waveguide of the wavelength multiplexing transceiver must have the size corresponding to it. The stripe width of the semiconductor laser is 5 µm at most, and the thickness of the semiconductor laser, which includes the clad layer, is only 2 to 5 µm. For this reason, it is difficult to couple the optical waveguide of about 50 µm in diameter with the semiconductor laser. Laser light emitted from the semiconductor laser device can be input to the optical waveguide of about 50 µm in diameter without any problem. However, it is very difficult to input the light emanating from the optical waveguide to the semiconductor laser device.

To cope with the above problem, in the third embodiment shown in FIGS. 18 and 19, the substrate 101 has a structure consisting of two plastic layers layered one over the other. The wavelength multiplexing transceiver when seen in the direction of an arrow B in FIG. 18 is perspectively illustrated in FIG. 19. For a better illustration of the structure of the substrate 101, the photo diode array 105, the semiconductor laser array 106 and the optical fiber 110 are contoured by dotted lines. As shown, the substrate 101 is structured such that a thin plastic thin film 117 is layered on a thick plastic thin film 118. An optical waveguide circuit including the optical waveguides 109a to 109f, which connects to the laser array 106, is formed in the thin plastic thin film 117. The optical waveguides 109h to 109k connecting to the photo diode array 105 and the optical waveguide 109g connecting to the optical fiber 110 are formed in the thick plastic thin film 118. The thickness d1 of the thin plastic thin film 117 is 10 µm, and the thickness d2 of the thick plastic thin film 118 is 30 µm. The second optical coupler 108 is formed by laying the optical waveguide 109f of the thin plastic thin film 117 on the optical waveguide 109g of the thick plastic thin film 118. The optical waveguide 109f, which couples the second optical coupler 108 with the first slab waveguide 102, is shaped such that a portion 109f of he waveguide closer to the second optical coupler 108 is broad, 40 µm, and a portion $109f_2$ closer to the first slab waveguide 102 is narrow, 10 µm. Accordingly, the optical waveguide at the location coupled with the optical fiber 110 is shaped in square, 40 µm×40 µm. The known selective photopolymerization is used for forming the optical waveguides in the plastic thin films 117 and 118. The selective photopolymerization is discussed by T. Kurosawa, N. Takato, S. Okikawa and T. Okada in their paper "Fiber optic sheet formation by selective photopolymerization, Appl. Opt. 17, p 646 (1978). The substrate 101 was formed by laminating two plastic thin films having optical waveguides already formed therein. The thin films may be another other material than plastic, if it allows optical waveguides to be formed therein.

FIG. 20 shows a fourth embodiment of the present invention. In the fourth embodiment, a wavelength multiplexing transceiver for optical communication is formed as an integrated optical circuit on a semiconductor substrate 131. FIG. 20(a) is a plan view of the wavelength multiplexing transceiver; FIG. 20(b) is a cross sectional view taken along a line of X—X in FIG. 20(a); and FIG. 20(c) is a side view of the same. The wavelength multiplexing transceivers of the fourth embodiment, and fifth to seventh embodiments to be given later are three-wavelengths multiplexing transceivers.

In FIG. 20, reference numerals 134a to 134c, and 135 designate semiconductor laser elements. The semiconductor laser elements 134a to 134c correspond to the semiconductor laser elements 106a to 106c. The semiconductor laser element 135 corresponds to the semiconductor laser element 106e. Photo diodes 136a to 136c correspond to the photo diodes (not shown) of the photo diode array 105 shown in FIG. 16. The structure of the photo diodes 136a to 136c is substantially the same as that of the semiconductor laser elements 134a to 134c. When it is fed with current, it serves as a laser diode. When it receives light, it generates photo current. The laser elements 134a to 134c are different in element length from the photo diodes 136a to 136c. The length of the laser elements 134a to 134c is 250 µm, and the length β is 10 µm (the illustration of FIG. 20 roughly shows a layout of elements, and the layout is not exact in the reduced scale). Such a figure of the photo diode length is selected because the photo diode of 10 µm long can satisfactorily absorb light. If the element length is selected to be long, the stray capacitance of the element is increased, and cannot handle the received light signals, which are modulated at high speed. The pitch of the laser elements 134a to 134c is 10 µm, and the pitch of the photo diodes 136a to 136c is also 10 µm. The width S of the optical waveguide is 3 µm. The substrate 31 is: L3×L4=10 mm×10 mm.

The first slab waveguide 102, the second slab waveguide 103, the first optical coupler 107, the second optical coupler 108, and the optical waveguides for wiring are semiconductor optical waveguides. The portion of-the substrate connecting to the optical fiber 110 and the end face thereof on which the photo diodes 136a to 136c are covered with a anti-reflection coat 137. The anti-reflection coat 137 is not formed on the portion of the substrate where the laser elements 134a to 134c and 135. The substrate 131 and the optical fiber 110 are optically coupled with each other by a coupling lens 138.

The first and second slab waveguide 102 and 103 are provided with the concave gratings 111a and 111b, respectively. In the concave gratings, since 500 gratings/mm, the grating pitch p is 2 µm. The radius of curvature (Rowland radius) R of the concave grating is 15 mm. A refractive index of the GaAlAs alloy is approximately 3.5. A wavelength dispersion on the focal plane of the concave grating is 1000 nm per 1 mm. Accordingly, the array of 10 µm can multiplex wavelengths at the pitches of 10 nm.

A method of manufacturing the wavelength multiplexing transceiver of the fourth embodiment will be described in brief. The substrate 131 was a GaAs substrate. AlGaAs double hetero structure is epitaxial grown on the substrate 131 by a MOCVD (metal organic chemical vapor deposition) method. Si is diffused into other portions than those portions where the laser elements 134a to 134c and 135, and the photo diodes 136a to 136c are formed, so that the double hetero structure is disordered. This process is called IID (impurity induced disordering) process. The structure is dry etched to form the concave gratings 111a and 111b. In the fourth embodiment, when the concave gratings 111a and 111b are formed, the respective optical waveguides (slab waveguides and wiring optical waveguides) are also formed as ridge type waveguides. Following the electrode formation and cleavage, the anti-reflection coat 137 is formed on the end face of the substrate 131 by deposition process. At this time, the portions of the substrate corresponding to the laser elements 134a to 134c and 135 are covered with a mask.

Figure 21:
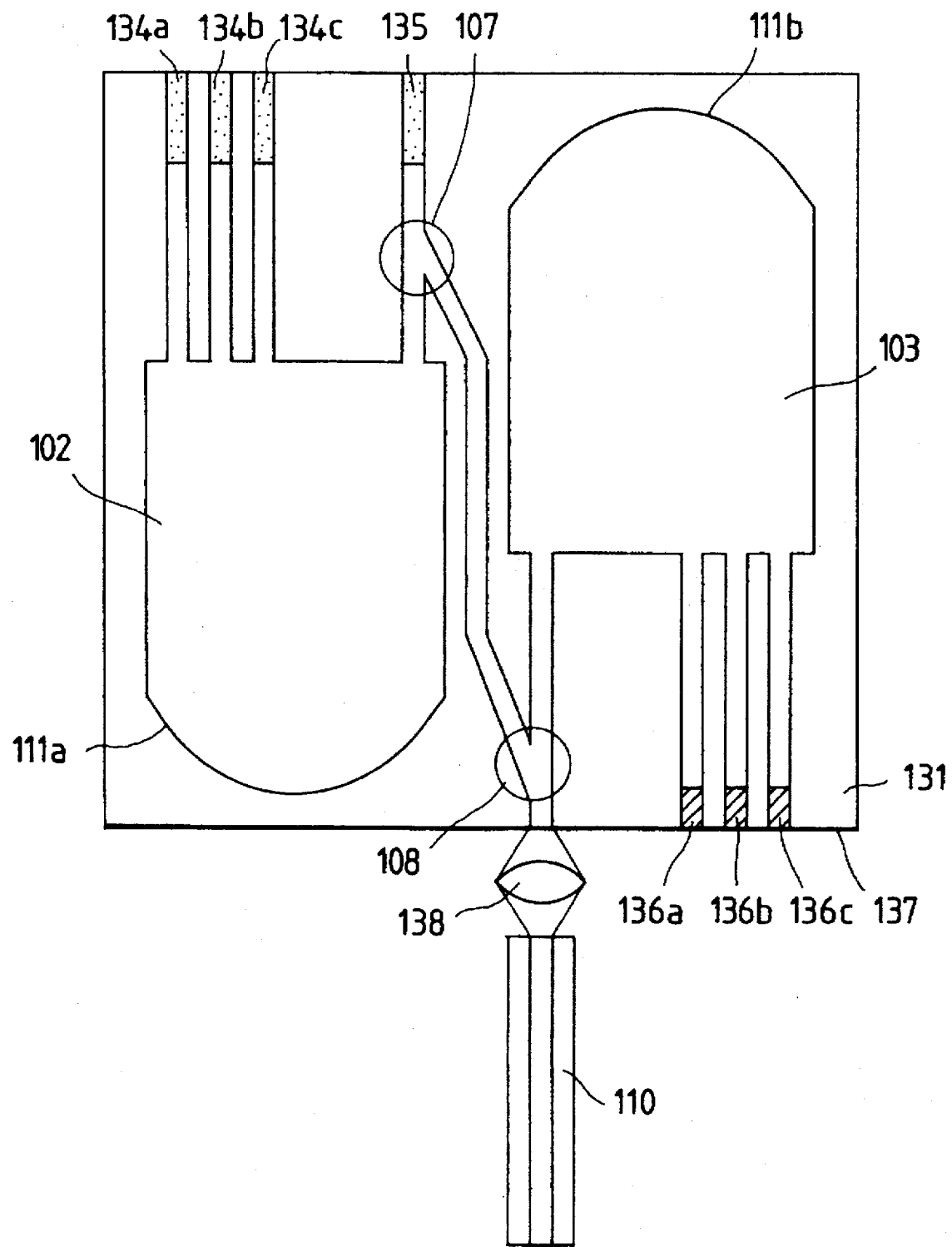
FIG. 21 is a diagram showing a fifth embodiment of a wavelength multiplexing transceiver according to the present invention.

FIG. 21 is a fifth embodiment of the invention. The fifth embodiment is a modification of the fourth embodiment. In the structure of the fourth embodiment shown in FIG. 20, the mask is required when the anti-reflection coat 137 is formed. This makes it difficult to manufacture. To cope with this, in the fifth embodiment of FIG. 21, the concave grating 111a for transmission and the concave grating 111b for reception are opposite to each other in the direction. Further, the laser elements 134a to 134c and 135 are formed in the end face of the substrate 131 different from that where the photo diodes 136a to 136c are formed. Since the fifth embodiment is thus constructed, there is no need of using the mask when the anti-reflection coat 137 is formed on the end face where the photo diodes 136a to 136c are formed.

Figure 22:
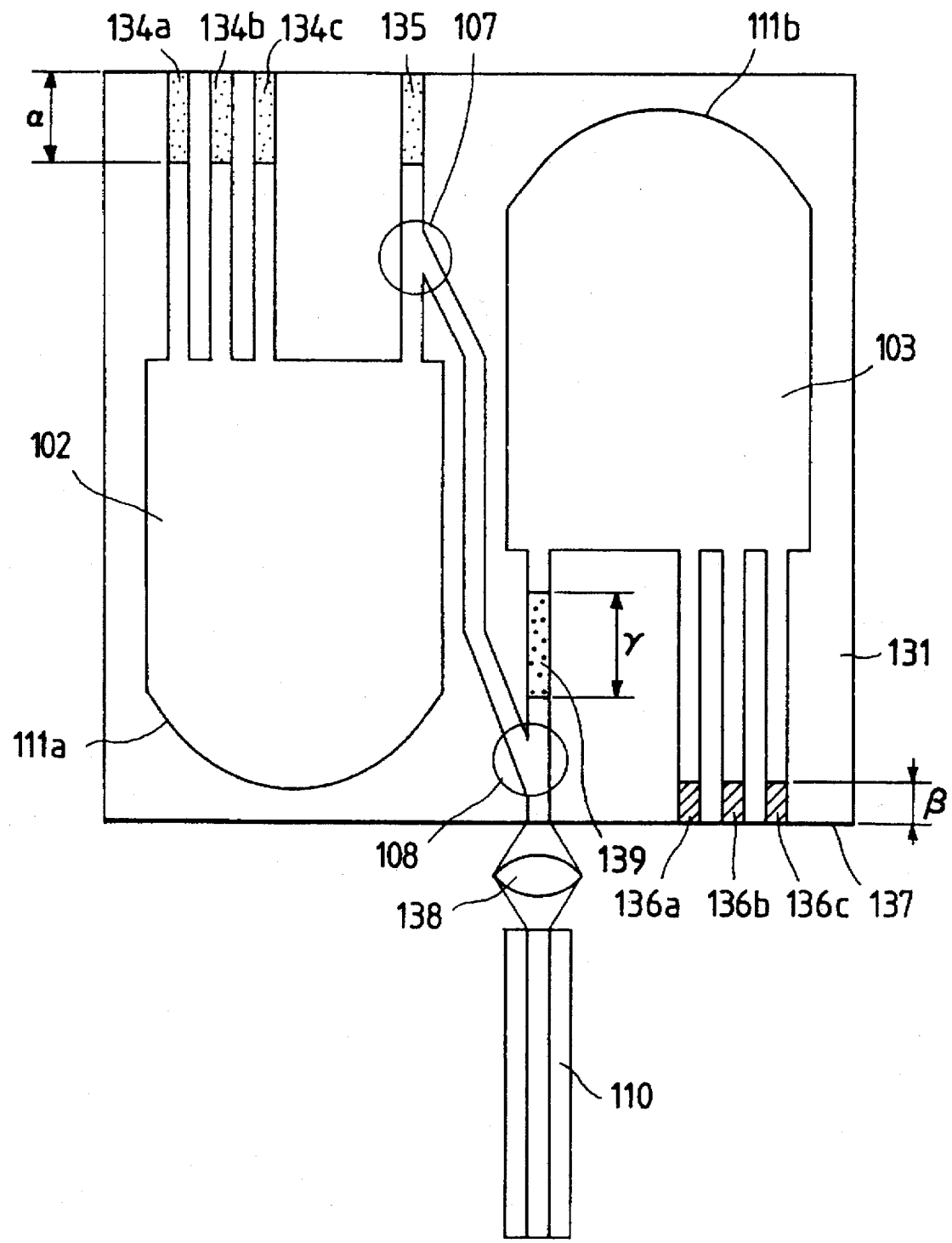
FIG. 22 is a diagram showing a sixth embodiment of a wavelength multiplexing transceiver according to the present invention.

FIG. 22 shows a sixth embodiment of the invention. In this embodiment, an optical amplifier 139, such as a semiconductor laser amplifier, is formed in the optical waveguide, which connects the second optical coupler 108 to the second slab waveguide 103. The structure of the optical amplifier 139 is substantially the same as that of the laser elements 134a to 134c and 135. The element length of γ the optical amplifier 139 is 500 μm, in this embodiment. The optical amplifier 139, which amplifies the received light signal, compensates for the loss of the light signal when it passes through the waveguide. The loss by the semiconductor waveguide is approximately 10 dB/cm, and this figure is much larger than 0.1 dB/cm of the glass waveguide. Particularly, in a case where the wavelength multiplexing transceiver is integrated on the semiconductor substrate, the semiconductor laser amplifier can compensate for the waveguide loss, which results from the use of the semiconductor slab waveguides. In this respect, the sixth embodiment can prevent the performance deterioration of the wavelength multiplexing transceiver when it is integrated.

Figure 23:
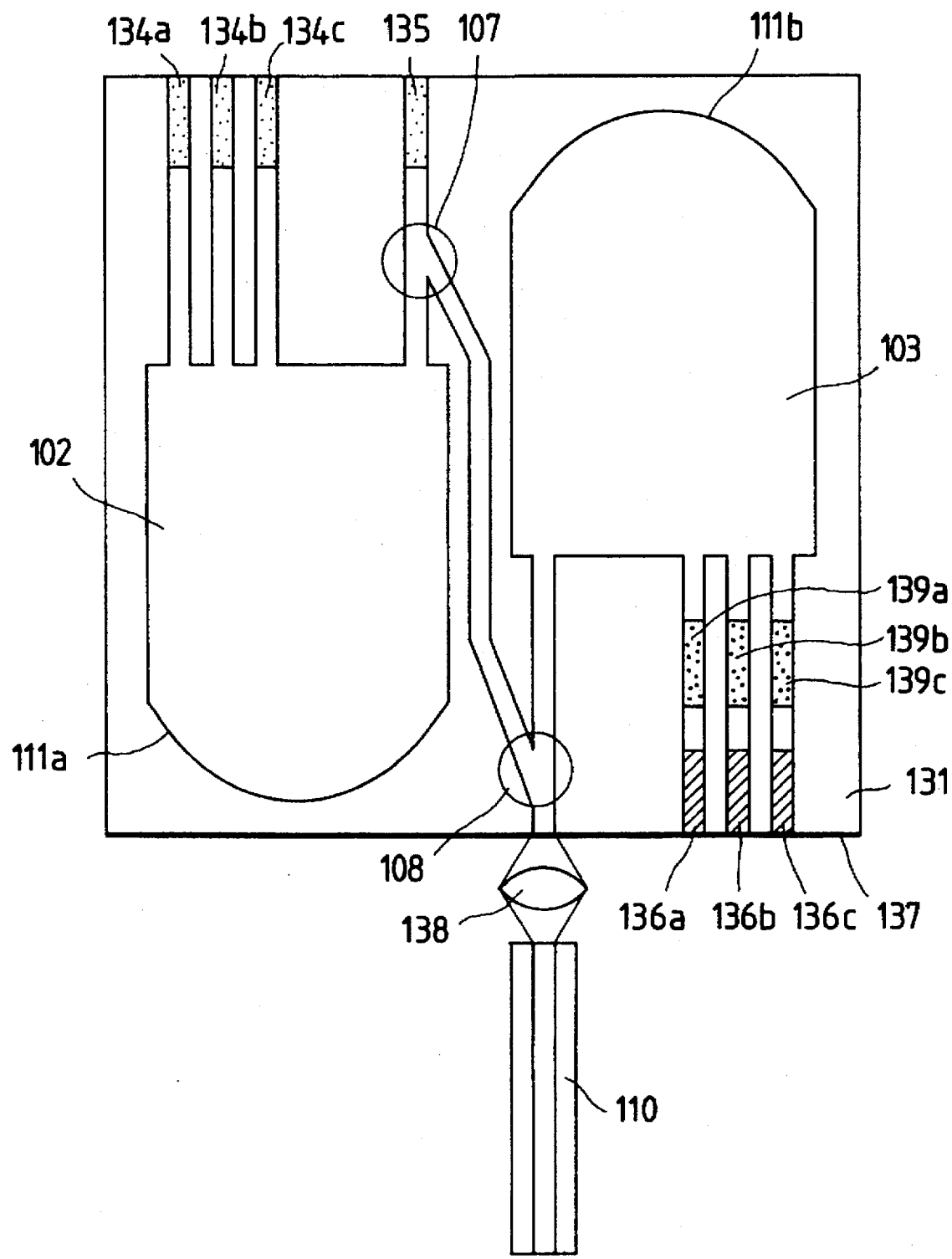
FIG. 23 is a diagram showing a seventh embodiment of a wavelength multiplexing transceiver according to the present invention.

FIG. 23 shows a seventh embodiment of the present invention. The seventh embodiment is a modification of the sixth embodiment of FIG. 22. Optical amplifiers 139a to 139c are provided in the waveguide connecting the second slab waveguide 103 to the photo diodes 136a to 136c.

Use of the optical amplifiers is effective particularly when the wavelength multiplexing transceiver is integrated on the semiconductor substrate. The optical amplifier may be applied for the case using the glass or plastic substrate. The optical amplifier may be any other amplifier than the semiconductor laser amplifier. The optical amplifier may be realized by forming an optical waveguide on the glass substrate doped with rare earth element.

Figure 24:
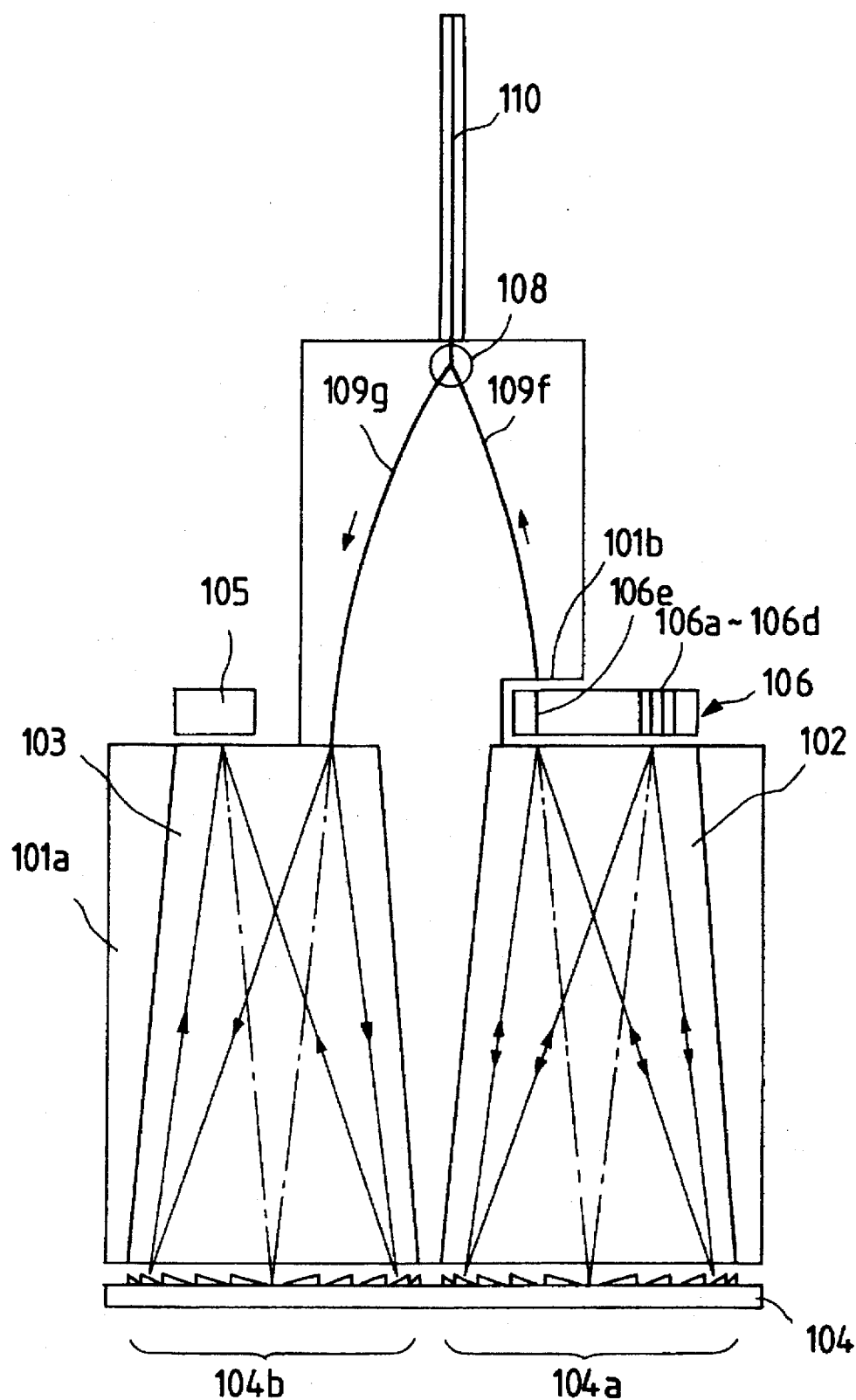
FIG. 24 is a diagram showing an eighth embodiment of a wavelength multiplexing transceiver according to the present invention.

FIG. 24 shows an eighth embodiment of the invention. The eighth embodiment, like the first to third embodiments, is of the four-wavelengths multiplexing type. Like reference numerals are used for designating like or equivalent portions in the first to third embodiments. In the eighth embodiment, the substrate 101a is shaped like a trapezoid as viewed in cross section. The upper end faces of the slab waveguides 102 and 103 are exposed at the stepped portion of the substrate 101a. The narrow part of the substrate 101a, which is located closer to the slab waveguide 102, is inwardly cut away to form a cut-away portion 101b. A semiconductor laser array 106 is disposed in the cut-away portion 101b. The laser array 106 contains five semiconductor laser elements 106a to 106e. Both end faces of the laser element 106e is covered with anti-reflection coats. In the case of the remaining laser elements 106a to 106d, only the end faces thereof closer to the first slab waveguide 102 are covered with the anti-reflection coat. The laser element 106e of the laser array 106 is connected to the second optical coupler 108 by means of the wiring optical waveguide 109f. The wavelength multiplexing operation in the eighth embodiment is similar to that of each of the embodiments as mentioned above. In the present embodiment, the light signal is output from the end of the laser element 106e of the laser array 106, which is far from the first slab waveguide 102, while in the above-mentioned embodiments, it is output from the first slab waveguide 102.

A photo diode array 105 is disposed in the stepped portion of the substrate, which is closer to the second slab waveguide 10. The eighth embodiment is different from the above-mentioned embodiment in that the second slab waveguide 103 and the photodiode array 105 are coupled with each other not using the waveguide. However, the basic spectroscoping and image forming operations are not unchanged.

Also in the eighth embodiment, the optical systems having the same structure may be used for both the transmitting and receiving sections of the wavelength multiplexing transceiver. In this respect, the device structure is simplified.

In the embodiments thus far described, the Fresnel reflecting mirrors and the concave gratings are used for the spectroscoping means in the wavelength multiplexer of the slab waveguide type. Those elements may be replaced by chirped gratings or a spectroscope of the array waveguide type.

As seen from the foregoing description, the same structure of the spectoscoping system is used for the transmitting and receiving sections of the wavelength multiplexing transceiver, so that the device structure is simplified. Further, the wavelength multiplexing transceiver is formed on the semiconductor substrate in an integrating manner. The manufacturing process is also simplified. Incorporating the optical amplifier into the receiving circuit of the integrated optical circuit, which forms the wavelength multiplexing transceiver, can compensate for the waveguide loss by the semiconductor optical waveguide, eliminating the performance deterioration, which results from the integrated fabrication of the wavelength multiplexing transceiver.

FIG. 25 shows a first embodiment of an interconnectable 5-port star coupler according to of the present invention. Three 1×2 equal branching circuits 205 are combined in a tree fashion, thereby forming an equal branching circuit unit 203 with four ports. As shown, five light-equal branching circuit units 203 are arrayed on a substrate 201 in a star fashion, thereby forming the star coupler. A light signal emanating from an optical fiber 202 is equally divided into four light signals, by the branching circuit unit 203. Those divided light are distributed to the remaining optical fibers 242, through optical waveguides 201a formed on the same plane of the substrate 201. The integrated optical circuit contains five intersecting portions 204 where the optical waveguides 201a intersect.

Figure 26A:
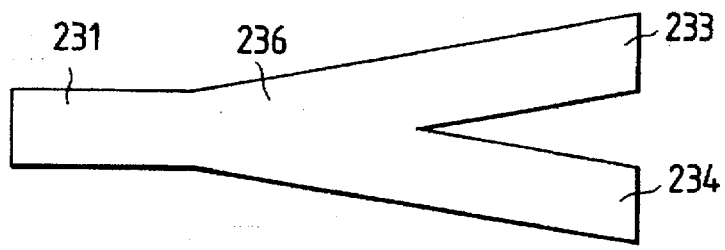
FIGS. 26(a) to 26(d) are diagrams each showing an example of a optical coupler.

In the 1×2 equal branching circuit 205, as shown in FIG. 26(a), a light signal enters an optical waveguide 231, passes through a mixing part 236, and is branched into two optical waveguides 233 and 234. The equal branching circuit 205 is frequently called a Y branching circuit since it is shaped like letter Y. In the case of the equal branching circuit 205, two optical waveguides 233 and 234 are directly coupled together. Because of this, its junction loss is small. However, in some light propagation modes, its branching ratio is often limited. Specifically, in a single mode, it can branch the light signal at only 1:1 of the branching ratio, basically.

Figure 26B:
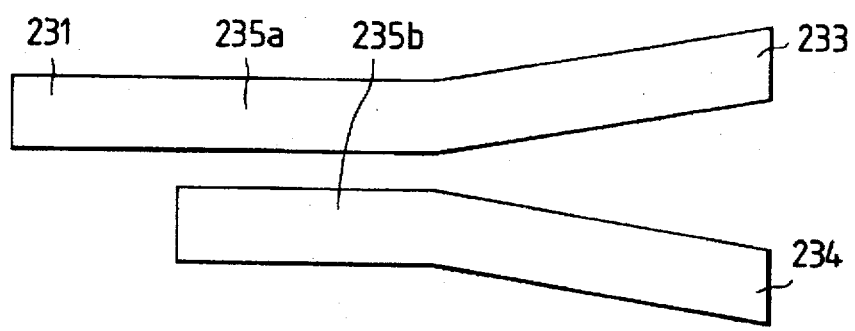

A 1×2 Evanescent optical coupler (in other words, an optical coupler based on coupled mode theory), as shown in FIG. 26(b), includes a portion where two optical waveguides 235a and 235b are closely located. This optical coupler functions to transfer a light signal from one waveguide to another via by the Evanescent coupling. Structurally, an extremely thin medium (clad) of low refractive index is located between two optical waveguides (core), made of medium of high refractive index. Energy is transferred from one waveguide to another via Evanescent wave. In other words, this optical coupler is based on coupled mode theory. This optical coupler is advantageous in that it can take a desired branching ratio, but is disadvantageous in that the junction loss is large as described above.

A light signal coming in through a port of the star coupler shown in FIG. 25 is branched into four light signals by the branching circuit unit 203, and distributed to other ports than the light signal receiving port. Since light has a good rectilinear propagation, the light signal propagating through one waveguide is little leaked to another waveguide at the intersecting portion 204.

At the intersecting portion 204, no interference occurs between the waveguides if an angle δ between the waveguides exceeds a value two times as large as a critical angle θ of the waveguide. The reason for this follows. As shown in FIG. 27, an incident angle ω of light from one waveguide to another is given by the follow equation:

$$\omega = \delta - \theta \quad (3)$$

If ω>θ, no light is induced into another waveguide. Then, we have $$\omega > 2\theta \quad (4)$$

The critical angle of the waveguide is a maximum angle which allows total reflection to occur on the interface between the core and clad of the optical waveguide. It is given by $$\theta = 90 \sin^{-1}(n2/n1) \quad (5)$$

where n1 is refractive index of the core, and n2 is refractive index of the clad (n1>n2). Where the refractive index of the core and clad is 2%, θ is approximately 3° C. Accordingly, in this case, δ must be larger than 6°.

Where the intersection angle δ is large, the light which does not couple the waveguides at the intersecting portion 204 increases relative to the other light. This results in increase of loss (transmission loss). The fact that the transmission loss abruptly increases when the intersection angle δ decreases below 20°, has been numerically calculated (seen Takahashi and Inagaki "Analysis of the transmission loss in matrix optical waveguide", The 1992 IEICE (institute of electronics/information/communication Engineers) spring conference record, C-192 (1992)). For this reason, δ is preferably lager than 20°.

In the embodiment of FIG. 25, the substrate 201 is made of glass, and the optical waveguides 201a is a single mode optical waveguide formed by an ion exchange method. It is evident that the material and the manufacturing method are not limited to the just mentioned ones. In the present invention, the light signal is branched at 1:1 by the equal branching circuit 205 of the branching circuit unit 203. Therefore, when the invention is applied for the single mode, interconnectable star coupler, it effectively operates. As a matter of course, the invention is applicable for the multi-mode, interconnectable star coupler. The difference between the refractive index values of the core and clad may be properly selected.

Interconnectable, 9-port or 17-port star couplers may be constructed according to the invention. In this case, 8 and 16 branching equal branching circuit units are used.

Figure 28:
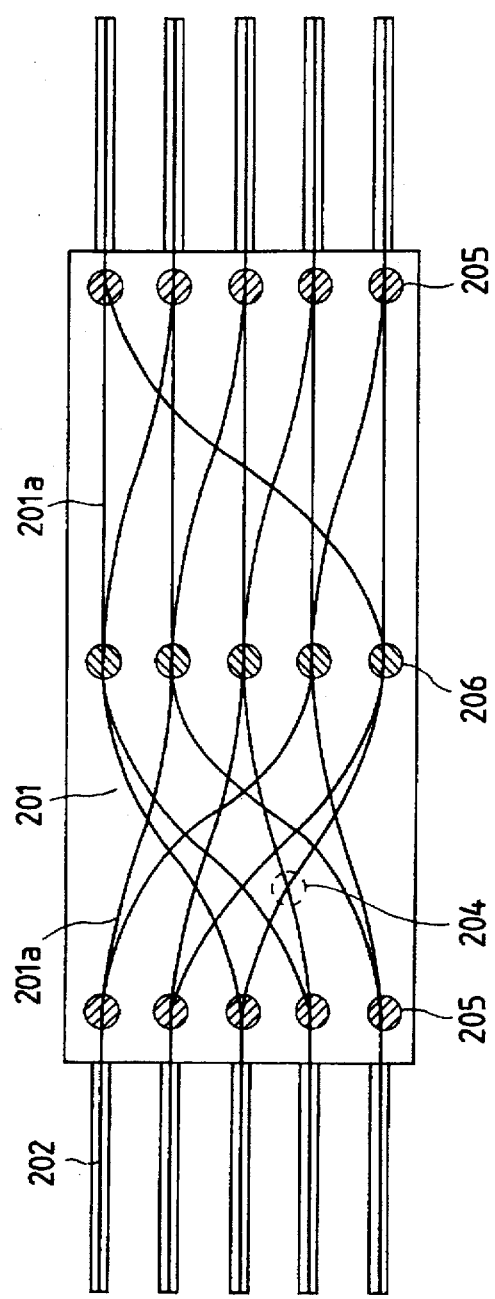
FIG. 28 is a diagram showing an example of an interconnectable star coupler.

FIG. 28 is a diagram showing an interconnectable star coupler with a pair of 5-port groups according to a second embodiment of the invention. As shown, optical waveguides, a 1×2 equal branching circuit 205, and a 2×2 equal branching circuit 206 are formed on the substrate 201. Optical fibers 202 are derived from the substrate 1, corresponding to the respective ports.

In the second embodiment of the FIG. 28, the 1×2 equal branching circuit 205 is used in place of the 1×2 fiber coupler 231, and the 2×2 equal branching circuit 206 is used in place of the 2×2 fiber coupler 232. In a conventional fiber coupler, only the Evanescent optical coupler can be manufactured with some restrictions on the manufacturing. On the other hand, use of the equal branching circuit 205 is allowed in the integrated optical circuit of the second embodiment shown in FIG. 28. In the fiber coupler, it is difficult to directly couple two optical fibers shaped circular in cross section. For this season, two optical fibers shaped circular in cross section are located closely, and it is filled with medium of low refractive index in a manner that the medium surrounds the optical fibers. Therefore, only the optical coupler by the Evanescent wave coupling can be formed. On the other hand, in the integrated optical circuits, optical waveguides are formed in or on the substrate by the photolithographic technique. Accordingly, it is very easy to manufacture two optical waveguides directly coupled, thereby eliminating the junction loss. Further, in the instant embodiment, the angle δ at the intersecting portions in the integrated optical circuit is larger than the critical angle θ of the optical waveguide. This eliminates the interference between the optical waveguides.

Figure 26C:
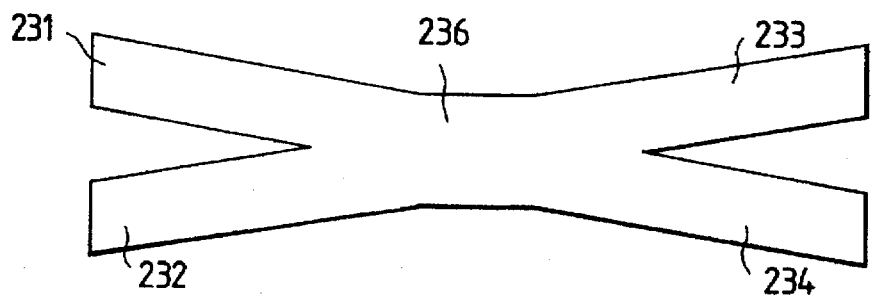
Figure 26D:
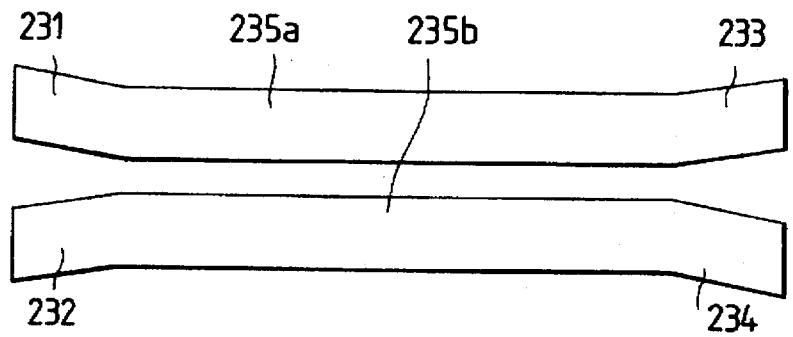

The 2×2 equal branching circuit 206 may be either of the junction type as shown in FIG. 26(c) or the Evanescent optical coupler type. In this case, the Y equal branching circuits 205 must be provided at the ports connecting to the optical fibers 202. In FIGS. 26(a) and 26(c), the optical waveguides 231 and 232 or 233 and 234 intersect at an angle, which is much smaller than the critical angle θ.

In the second embodiment of FIG. 28, the light signal is merely distributed to the port groups oppositely disposed. Accordingly, optical waveguides, which are less bent than those of the prior art or the FIG. 25 embodiment, may be used. Accordingly, the loss caused by the bending of the optical waveguide can be reduced. The loss caused by the bending of the optical waveguide of the single mode cannot be described in geometrical optics. The fact that the loss increases with decrease of the curvature is empirically confirmed. The loss causing mechanism is complicated, involving two factors, radiation loss and mode transformation loss. (For more details, reference is made to Azuma and Kuwaki "A study on the loss change mechanism at an optical fiber bending region", The 1992 IEICE spring conference, B-893 (1992)).

Figure 29:
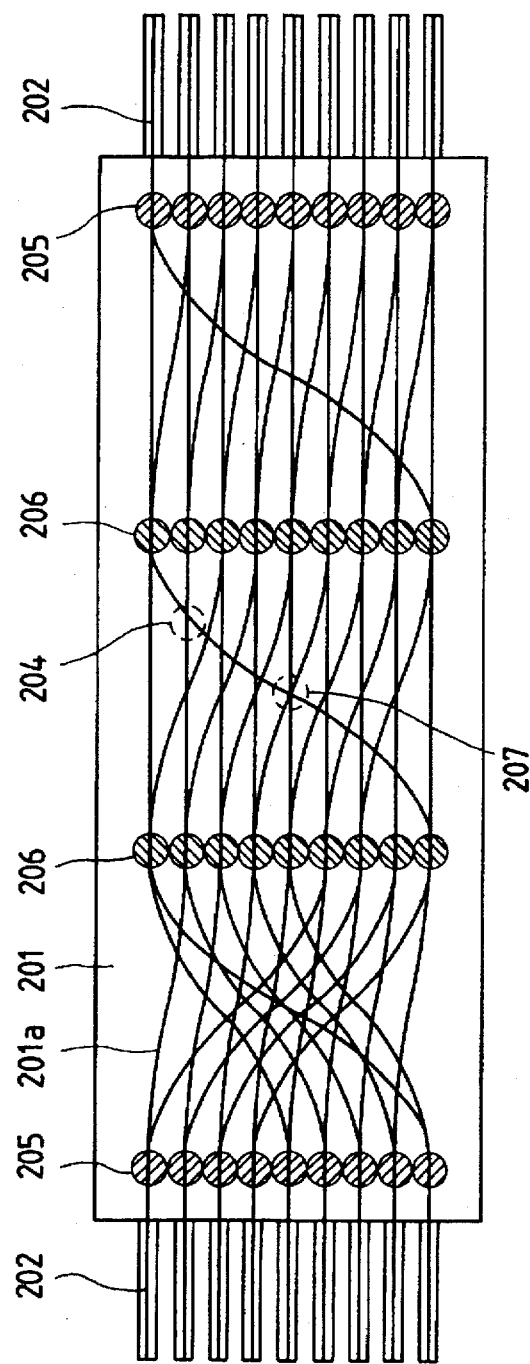
FIG. 29 is a diagram showing an interconnectable star coupler with a pair of 9-port groups according to the present invention.
Figure 30A:
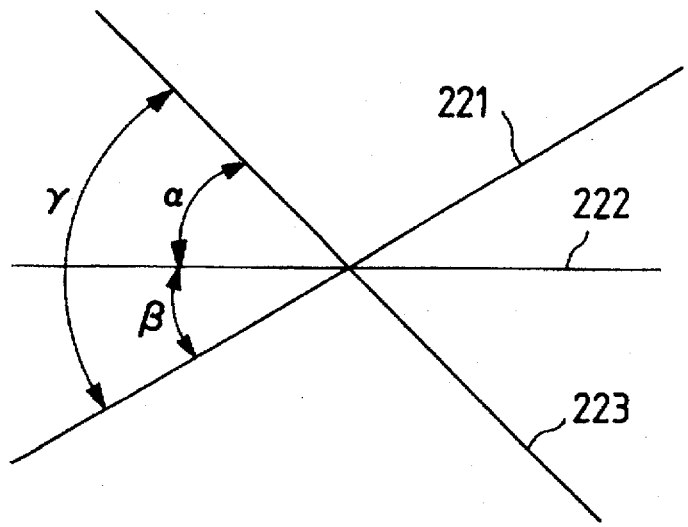
FIGS. 30(a) and 30(b) are diagrams each showing an optical waveguide having intersecting portions.
Figure 30B:
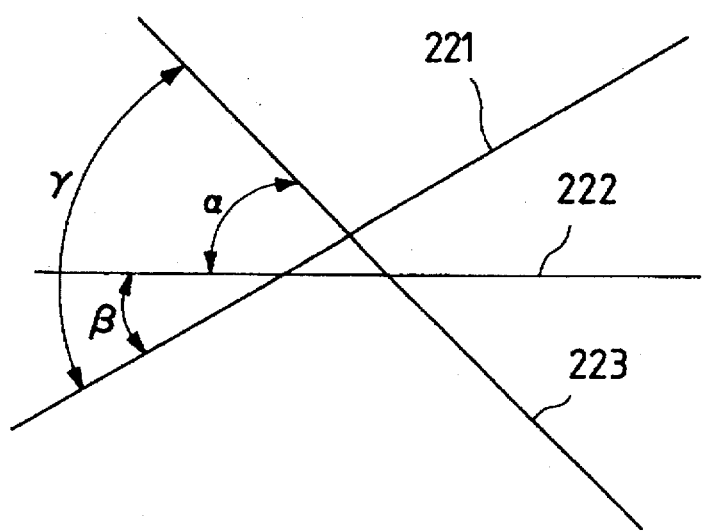

FIG. 29 shows an interconnectable star coupler with a pair of 9-port groups according to a third embodiment of the invention. The third embodiment is different from the second embodiment in that the number of ports is increased from five to nine. The increase of the number of ports makes the integrated optical circuit complicated. Accordingly, intersecting portions 207 where three optical waveguides intersect are present, as shown in FIG. 29. Also in this case, angles $\alpha$, $\beta$ and $\gamma$ formed by the waveguides 221, 222, and 223, shown in FIG. 30(a), are selected to be larger than a value two times of the critical angle $\theta$ of the optical waveguide. When the number of optical waveguides is increased, scattered light will increase. To avoid this, it is suggestible to slightly change the paths of the waveguides so as not to cause the intersecting portions of three or more waveguides.

According to the invention, the single mode, interconnectable multi-port start coupler can be constructed not using the 1×2 Evanescent optical coupler. Therefore, the star coupler is free from the junction loss caused by the 1×2 Evanescent optical coupler. The circuit can be constructed by using merely the combination of the 1×2 equal branching circuit and the 2×2 equal branching circuit. Therefore, also in the multi-mode, interconnectable star coupler, its manufacturing is easy.

Further, embodiments of an optical coupler will be described with reference to a single mode optical waveguide. FIG. 31 is a plan view showing an embodiment of an optical coupler according to the present invention. The optical coupler shown in FIG. 31 is a optical coupler formed by connecting in series an asymmetrical Y branching circuit 302 and an Evanescent optical coupler 304. The asymmetrical Y branching circuit involves the branching circuit of the type in which two optical waveguides having different shapes in cross section are branched from the original optical waveguide at equal angles with respect to the latter, the branching circuit of the type in which two optical waveguides having the same shapes in cross section are branched from the original optical waveguide at different angles with respect to the latter, and the branching circuit of the type in which two optical waveguides having different shapes in cross section are branched from the original optical waveguide at different angles with respect to the latter. In the asymmetrical Y branching circuit 302, an optical waveguide 302b rectilinearly extends in align with the optical waveguide of the common part 301. The cross sectional area of the optical waveguide 302b is larger than that of an optical waveguide 302a. In the Evanescent optical coupler 304, two optical waveguides 304a and 304b are equal. Accordingly, in a junction part 303, the cross sectional area of the waveguide 303a increases toward the right side. At the interface of the junction part 330 and the Evanescent optical coupler 304, the optical path difference is adjusted so that the two waveguides are in phase, viz., the phase matching condition to be described later is satisfied.

In the single mode optical waveguide, as shown in FIG. 32, most of light from the common part 301 goes to the waveguide 302b, and the light goes little or no to the waveguide 302a. This property of single mode asymmetric y-branching circuit is described in: Bures et al. "Mode Conversion In Planar-Dielectric Separating Waveguide", IEEE J. Qauntum Electron., vol. QE-11, No. 1, pp 32–39 (1975). In the Evanescent optical coupler 304, light propagating through the waveguide 304b is branched to the waveguide 304a by the mode coupling. Accordingly, the optical coupler of FIG. 31 functions as an unequal optical coupler.

As shown in FIG. 33, a light signal coming in through an optical waveguide 305b of the branching portion 305 propagates into the waveguide 304b of the Evanescent optical coupler 304. In this coupler, the light signal is branched into the waveguide 304a by the mode coupling. The light signal from the waveguide 4b and the light signal branched into the waveguide 304a are joined together in the asymmetrical Y branching circuit 302. At this time, if both the light signals are out of phase, one of the light signals negates the other, resulting in signal loss. However, in this embodiment, the optical path difference is adjusted so as to satisfy the phase matching condition. Accordingly, this loss is not created.

As shown in FIG. 34, a light signal coming in through an optical waveguide 305a of the branching portion 305 propagates into the waveguide 304a of the Evanescent optical coupler 304. In this coupler, the light signal is branched into the waveguide 304b by the mode coupling. The light signal from the waveguide 304a and the light signal branched into the waveguide 304b are joined together in the asymmetrical Y branching circuit 302. Also in this case, the optical path difference is adjusted so as to satisfy the phase matching condition. Accordingly, this loss is not created.

Figure 35:
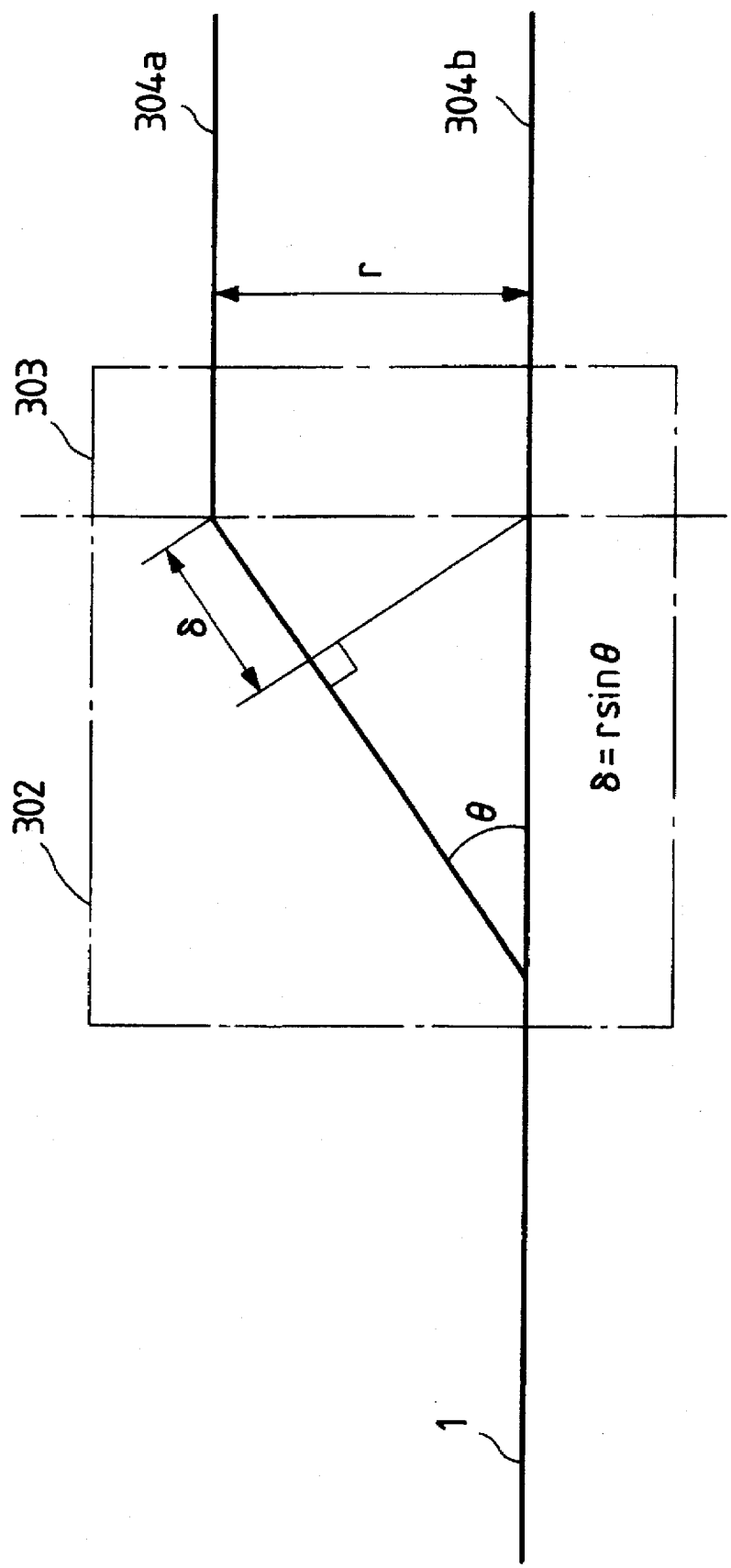

FIG. 35 is a diagram showing a model of optical paths in the optical coupler of FIG. 31. In the asymmetrical Y branching circuit 32, the optical path difference of $\delta=\gamma$ sing $\theta$ is caused. $\gamma$ indicates the interval of the optical waveguides in the Evanescent optical coupler 304, and $\theta$, an branching angle of the asymmetrical Y branching circuit 302. When the optical path difference $\delta$ is a multiple of the wavelength of propagating light, the phase matching condition is satisfied. Accordingly, the phase matching condition depends on the wavelength of the propagating light. The optical coupler of FIG. 31 must be designed according to the wavelength used.

Figure 36:
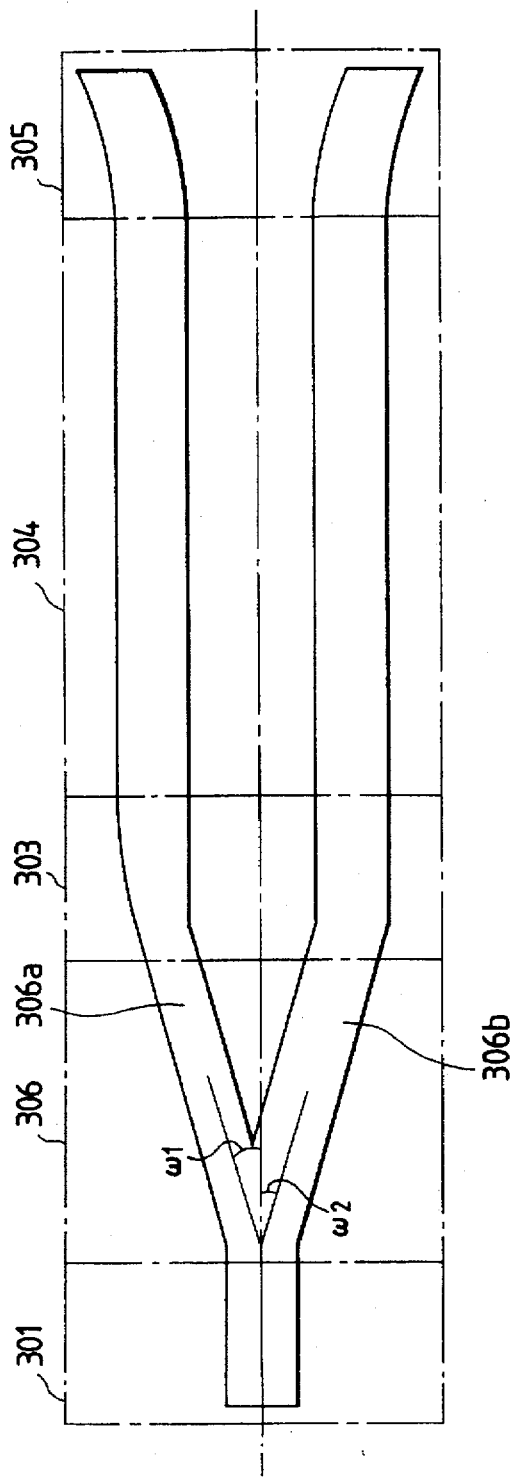
Figure 37:
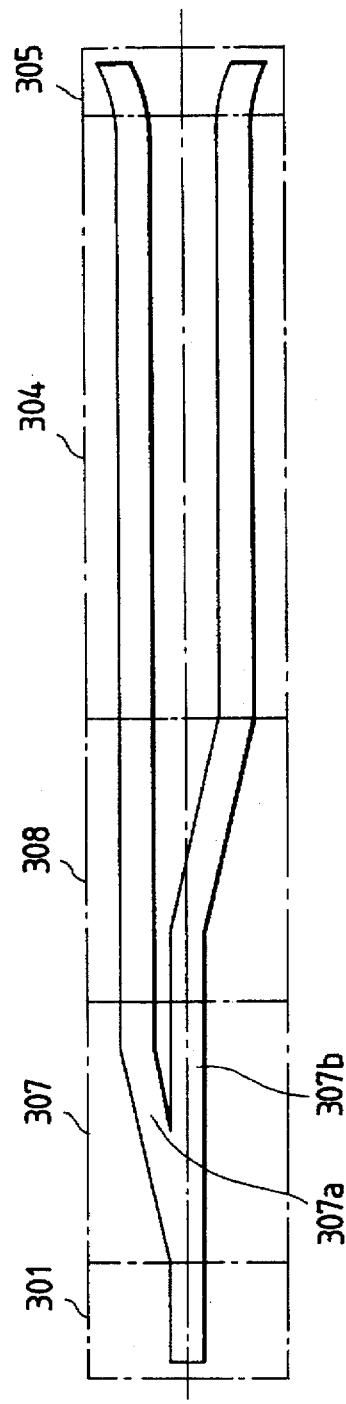

FIGS. 36 and 37 show other embodiments as modifications of the FIG. 31 optical coupler. In those embodiments, the optical path difference $\delta$ of the waveguides are set to zero (0). Therefore, the phase matching condition does not depend on the wavelength.

The embodiment of FIG. 36 includes an asymmetrical Y branching circuit 36 in which optical waveguides having different sectional areas are substantially symmetrically branched at angles $\omega 1$ and $\omega 2$. The sectional area of the waveguide 306a is smaller than that of the waveguide 306b in FIG. 36. Further, the waveguide is branched at an angle $\omega 1 - \omega 2$ with respect to the original waveguide 301. The waveguide of the smaller sectional area has a smaller refractive index. Accordingly, the light propagating speed is larger. If $\omega 1 = \omega 2$, the phase matching condition is not satisfied. For this reason, $\omega 1$ is set to be slightly larger than $\omega 2$ so that the optical path difference $\delta$ is 0.

In the FIG. 37 embodiment, an asymmetrical Y branching circuit 307 and an optical path difference adjusting part 308 are provided so that the optical path difference $\delta$ is 0. In the asymmetrical Y branching circuit 307, optical waveguides 307a and 307b having equal sectional areas are branched at different angles with respect to the original optical waveguide 301. The waveguide 307a rectilinearly extending in the asymmetrical Y branching circuit 307 is bent in its optical path in the optical path difference adjusting part 308. As a result, in the Evanescent optical coupler 304, the optical path difference $\delta$ is 0.

As known, the coupling characteristic of the Evanescent optical coupler depends on the wavelength. This must be allowed for when designing actual optical couplers.

As seen from the foregoing description, the optical couplers of FIGS. 31, 36, and 37 function as optical couplers free from the junction loss.

FIG. 38 is a plan view showing an embodiment of an interconnectable star coupler according to the invention. In this star coupler, Evanescent optical couplers in a conventional star coupler are substituted by the optical couplers 11a to 11d shown in FIG. 31, 36 or 37. Use of the optical couplers 315a to 315d eliminates the junction loss. Accordingly, the star coupler of this embodiment is interconnectable and has less loss.

FIG. 39 is an embodiment as a modification of the FIG. 38 star coupler. In the star coupler of FIG. 39, a reflecting means 325 is provided in the optical waveguide circuit. The waveguide is bent substantially at right angle to form a bent portion 314. Accordingly, no circular waveguides as found in FIG. 38 are used. This reduces the area of the substrate required for the integrated optical circuit formation, realizing the size reduction of the star coupler. In the construction of FIG. 38, the branches of small branching ratio of the optical couplers 311a to 311d are connected to opposed terminals, while in the construction of FIG. 39, the branches of small branching ratio are connected to adjacent terminals. In the construction of FIG. 39, an X branching circuit 313 is used instead of the Evanescent optical coupler 312 in FIG. 38. If required, it may be the Evanescent optical coupler 312.

Figure 40A:
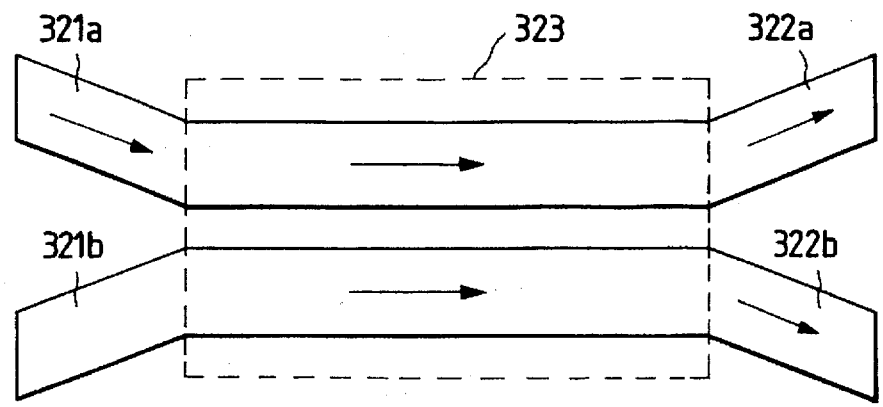
FIGS. 40(a) to 40(c) are diagrams showing an enlarged Evernescent optical coupler.

An enlarge view of the Evanescent optical coupler 312 is shown in FIG. 40(a). An enlarged view of the bent portion 314 is shown in FIG. 40(c).

In FIG. 40(a), a light signal coming in through the optical waveguide 321a is equally distributed into optical waveguides 322a and 322b, through the mode coupling action in a coupling part 324 where two optical waveguides are closely arrayed side by side. A light signal coming in through another optical waveguide 321b is also equally distributed into optical waveguides 322a and 322b in a similar way.

Figure 40B:
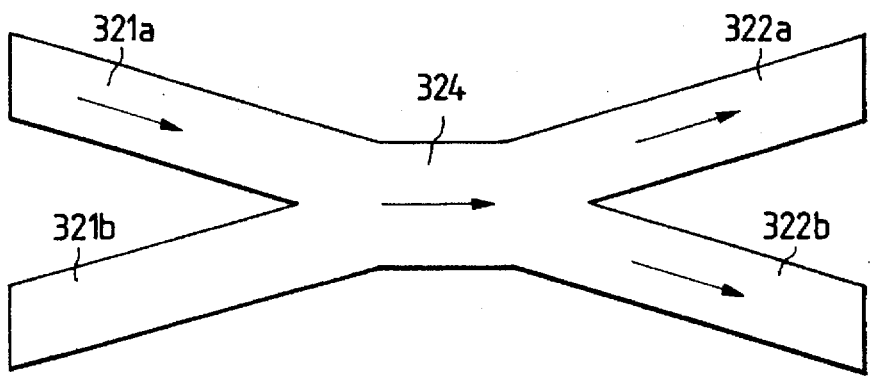

In FIG. 40(b), a light signal coming in through the optical waveguide 321a is equally distributed into optical waveguides 322a and 322b, through a mixing optical waveguide 324. A light signal coming in through another optical waveguide 321b is also equally distributed into optical waveguides 322a and 322b in a similar way.

Figure 40C:
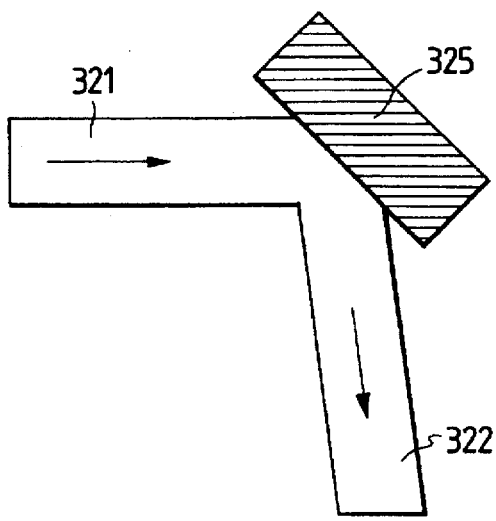

In FIG. 40(c), a light signal coming in through the optical waveguide 321a is reflected by the reflecting means 325 to be bent toward the optical waveguide 322. The reflecting means 325 is a total reflection mirror fabricated on the integrated optical circuit by dry etching process, in this instance of the embodiment. Such a technique is known (see Shibata, Okuda, Ikeda, and Monda, "Branching characteristic of multi-stage connected asymetric y-branch using total reflection", The 1992 IEICE (institute of electronics/ information/communication engineering) Spring Conference, C-198 (1992)).

The approach using the reflecting means in the optical waveguide more contributes to the size reduction of the integrated optical circuit than the conventional star coupler.

Figure 41:
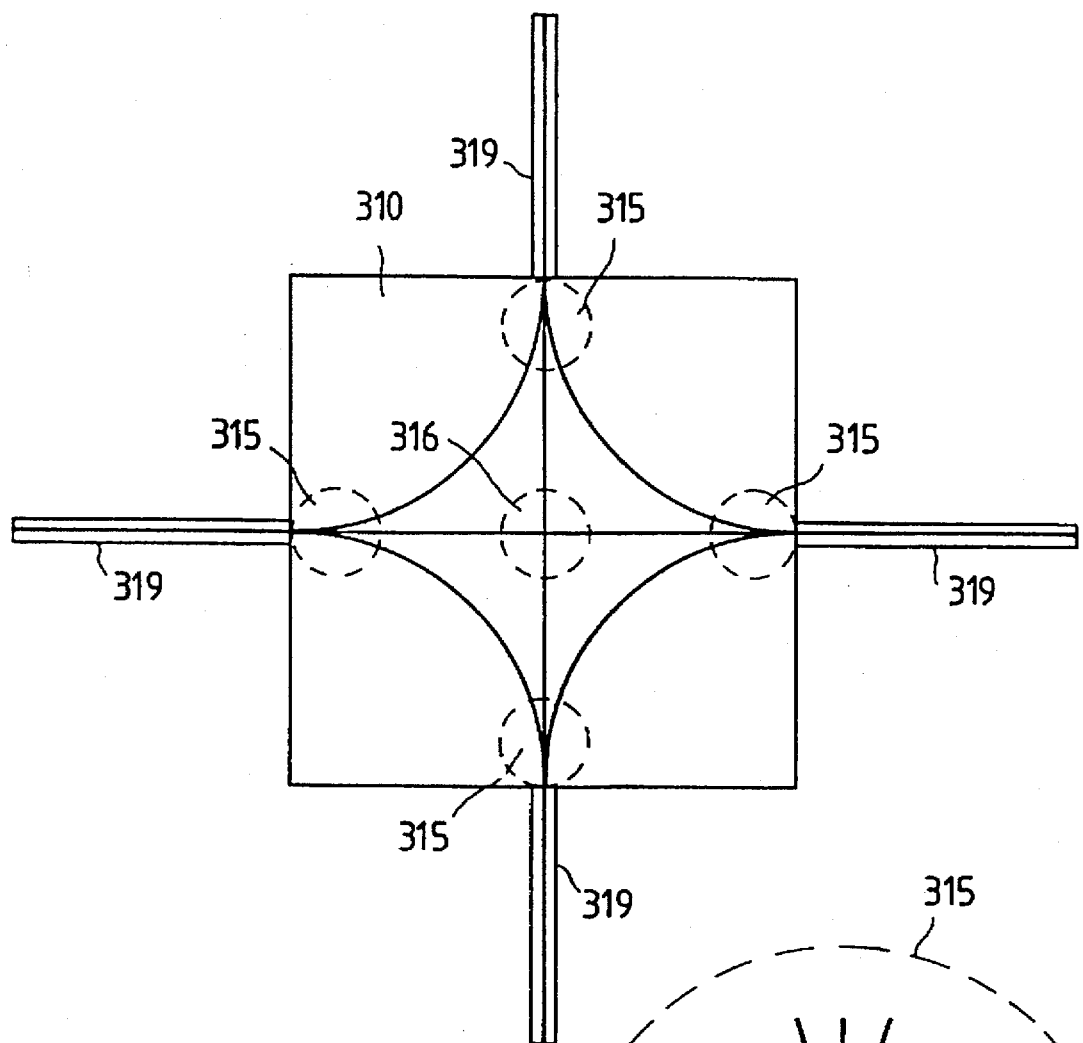
FIGS. 41 and 41(a) are diagrams showing an example of an interconnectable start coupler with four ports constructed using a 1×3 photocoupler.
Figure 41A:
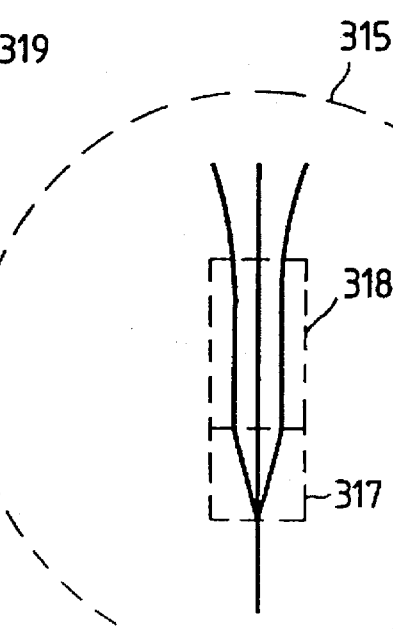

The present invention is also applicable for the 1×3 optical coupler. An interconnectable star coupler with four ports constructed using the 1×3 optical coupler 315 of the invention is illustrated in FIG. 41. The structure of a 1×3 branching circuit 317 is basically asymmetrical. Accordingly, if it is connected in series with an Evanescent optical coupler 318 (three optical waveguides are arrayed in parallel), the 1×3 optical coupler 315 free from the junction loss can be formed. Accordingly, an interconnectable star coupler with four ports can be formed by combining four number of such 1×3 optical couplers 315. Because of the rectilinear propagation of light, light signals propagating through the waveguides crossing at right angles do not interfere with each other in the intersecting portion 316 of the waveguides.

The optical coupler and the interconnetable star coupler of the invention can be fabricated by a know optical waveguide (integrated optical circuit) fabricating method, such as an ion exchange method or a flame deposition method.

As described above, the optical coupler with less junction loss can be realized. When the optical coupler is incorporated into the integrated optical circuit, an interconnectable star coupler with less loss can be realized. Provision of the reflecting means in the circuit allows the optical waveguide to be bent at substantially right angle. This leads to size reduction of the integrated optical circuit containing the interconnectable star coupler.

What is claimed is:

1. A wavelength multiplexing transceiver for wavelength multiplexing in an optical communication network comprising:

first and second slab waveguides;

a first optical waveguide for supplying an output light from said first slab waveguide to an input/output optical fiber;

a second optical waveguide for supplying an incident light from said input/output optical fiber to said second slab waveguide;

a optical coupler for branching an optical path of said input/output optical fiber to said first and second optical waveguides;

a laser array optically coupled to one end of said first slab waveguide, to the other end of which said optical coupler is coupled; and a light receiving element array optically couple to one end of said second slab waveguide, to the other end of which said optical coupler is coupled, said first and second slab waveguides, first optical waveguide, second optical waveguide, and optical coupler being commonly formed on a substrate.

2. A wavelength multiplexing transceiver comprising:

a first group of optical waveguides for coupling a laser array and a first slab waveguide type wavelength multiplexer;

a first optical coupler for coupling said first slab waveguide type wavelength multiplexer, an output waveguide, and at least one of said first group of optical waveguides;

a second optical coupler for coupling said output waveguide, an input waveguide, and an input/output optical fiber, type wavelength multiplexer; and a light receiving element array optically coupled to said second slab waveguide type wavelength multiplexer.

3. The wavelength multiplexing transceiver according to claim 2 wherein said first and second slab waveguide type wavelength multiplexers and said first and second optical couplers are formed commonly on a substrate.

4. The wavelength multiplexing transceiver according to claim 3 wherein said substrate comprises first and second thin layers in which optical waveguides connected to different waveguide type wavelength multiplexers are respectively formed.

5. The wavelength multiplexing transceiver according to claim 4 wherein said laser array and light receiving element array are integrally formed on said substrate.

6. The wavelength multiplexing transceiver according to claim 2 wherein said first and second slab waveguide type wavelength multiplexers are arranged in directions opposite to each other.

7. The wavelength multiplexing transceiver according to claim 2, wherein at least one optical amplifier is provided to the optical path between said second optical coupler and said light receiving element array.

8. The wavelength multiplexing transceiver according to claim 2, further comprising a reflecting device coupled to an end of said first slab waveguide opposite said first group of optical waveguides.

9. The wavelength multiplexing transceiver according to claim 8, wherein said reflecting device is a Fresnel reflecting mirror.

10. The wavelength multiplexing transceiver according to claim 8, wherein said reflecting device includes concave gratings.

11. The wavelength multiplexing transceiver according to claim 10, wherein said concave gratings are saw-tooth gratings arranged in a concave shape.

12. The wavelength multiplexing transceiver according to claim 2, further comprising a reflecting device coupled to an end of said second slab waveguide opposite said input waveguide.

13. The wavelength multiplexing transceiver according to claim 10, wherein said reflecting device is a Fresnel reflecting mirror.

14. The wavelength multiplexing transceiver according to claim 10, wherein said reflecting device includes concave gratings.

15. The wavelength multiplexing transceiver according to claim 12, wherein said concave gratings are saw-tooth gratings arranged in a concave shape.

16. The wavelength multiplexing transceiver according to claim 4, wherein said input/output optical fiber is multimode, and said first and said second thin layers are plastic thin films.

17. The wavelength multiplexing transceiver according to claim 3, wherein said substrate is a semiconductor material.

18. The wavelength multiplexing transceiver according to claim 6, further comprising a first reflecting device coupled to an end of said first slab waveguide and a second reflecting device coupled to an end of said second slab waveguide opposite said first reflecting device.

19. The wavelength multiplexing transceiver according to claim 3, wherein a cross-section of said substrate is shaped like a trapezoid.

* * * * *